United States Patent
Zhao et al.

(10) Patent No.: US 10,721,709 B2
(45) Date of Patent: Jul. 21, 2020

(54) ELECTRONIC DEVICE AND METHOD IN MOBILE BASE STATION

(71) Applicant: Sony Corporation, Tokyo (JP)

(72) Inventors: Xinsheng Zhao, Jiangsu (CN); Jieyi Zhao, Jiangsu (CN); Pen-shun Lu, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/311,170

(22) PCT Filed: Jun. 1, 2017

(86) PCT No.: PCT/CN2017/086823
§ 371 (c)(1),
(2) Date: Dec. 19, 2018

(87) PCT Pub. No.: WO2018/001031
PCT Pub. Date: Jan. 4, 2018

(65) Prior Publication Data
US 2019/0200319 A1    Jun. 27, 2019

(30) Foreign Application Priority Data
Jun. 27, 2016 (CN) .......................... 2016 1 0479556

(51) Int. Cl.
*H04W 64/00* (2009.01)
*H04W 24/10* (2009.01)
(Continued)

(52) U.S. Cl.
CPC .......... *H04W 64/003* (2013.01); *H04B 7/024* (2013.01); *H04L 5/0048* (2013.01);
(Continued)

(58) Field of Classification Search
CPC ......... H04W 64/003; H04W 36/00835; H04W 36/32; H04W 36/30; H04W 36/0069;
(Continued)

(56) References Cited

U.S. PATENT DOCUMENTS 10,313,945 B2 * 6/2019 Sankaranarayanan .. H04W 4/06
2009/0137265 A1 * 5/2009 Fiore; Oronzo ............................
H04W 36/00835
455/525
(Continued)

FOREIGN PATENT DOCUMENTS

CN    101057157 A    10/2007
GB    2 322 262 A    8/1998

OTHER PUBLICATIONS

English-language translation of International Search Report and Written Opinion for International Application No. PCT/CN2017/086823, dated Jul. 24, 2017.

*Primary Examiner* — Candal Elpenord
(74) *Attorney, Agent, or Firm* — Xsensus LLP

(57) ABSTRACT

An electronic device and a method in a mobile base station, the electronic device includes a processor, the processor is configured to: on the basis of one feature location in a predetermined feature location set, indicate a user equipment served by the mobile base station to measure a downlink channel quality of a detectable base station with respect to the one feature location; determine a cooperative base station of the mobile base station with respect to the one feature location on the basis of measurement result reported by the user equipment; and record the one feature location in association with the cooperative base station into a database.

5 Claims, 17 Drawing Sheets

(51) Int. Cl.
  *H04W 48/20* (2009.01)
  *H04L 5/00* (2006.01)
  *H04W 36/00* (2009.01)
  *H04B 7/024* (2017.01)
  *H04W 84/00* (2009.01)
  *H04W 36/32* (2009.01)
  *H04W 36/30* (2009.01)

(52) U.S. Cl.
  CPC ..... *H04W 24/10* (2013.01); *H04W 36/00835* (2018.08); *H04W 48/20* (2013.01); *H04W 36/0069* (2018.08); *H04W 36/0085* (2018.08); *H04W 36/30* (2013.01); *H04W 36/32* (2013.01); *H04W 84/005* (2013.01)

(58) Field of Classification Search
  CPC ..... H04W 48/20; H04W 24/02; H04W 24/04; H04W 24/08; H04W 24/10; H04W 84/005; H04B 7/024; H04L 5/0048
  See application file for complete search history.

(56) References Cited

U.S. PATENT DOCUMENTS

| | | | |
|---|---|---|---|
| 2013/0115954 A1* | 5/2013 | Charbit | H04W 36/32 455/437 |
| 2013/0343317 A1* | 12/2013 | Etemad | H04B 7/024 370/329 |
| 2014/0198715 A1* | 7/2014 | Zasowski | H04W 16/26 370/315 |
| 2016/0088585 A1 | 3/2016 | Garg | |
| 2016/0142944 A1 | 5/2016 | Cao | |
| 2018/0247544 A1* | 8/2018 | Mustafic | G08G 5/0069 |

* cited by examiner

| CRT IN MOBILE BASE STATION ||||||
|---|---|---|---|---|---|
| ROAD NUMBER | LOCATION INFORMATION | COMMUNICATION CAPACITY PEAK || COMMUNICATION CAPACITY VALLEY ||
| | | SELECTED BS | CREATION TIME | SELECTED BS | CREATION TIME |
| ROAD 1 | | | | | |
| ROAD 2 | | | | | |
| ⋮ | | | ⋮ | | |
| ROAD M | | | | | |

| CRT OF ROAD 1 | | | | |
|---|---|---|---|---|
| LOCATION INFORMATION | COMMUNICATION CAPACITY PEAK | | COMMUNICATION CAPACITY VALLEY | |
| | SELECTED BS | CREATION TIME | SELECTED BS | CREATION TIME |
| | | | | |

STORED IN SERVER

ELECTRONIC DEVICE AND METHOD IN MOBILE BASE STATION

CROSS-REFERENCE TO RELATED APPLICATIONS

This application is a National Stage Application based on PCT/CN2017/086823, filed on Jun. 1, 2017, and claims the priority of Chinese Patent Application No. 201610479556.2, entitled "ELECTRONIC DEVICE AND METHOD IN MOBILE BASE STATION", filed with the Chinese Patent Office on Jun. 27, 2016, the entire contents of which are incorporated herein by reference.

FIELD OF THE INVENTION

This application relates to the technical filed of wireless communication, and more particularly, to an electronic device and method in a mobile base station (BS) and an electronic device and method in a user equipment (UE), which are capable of determining a cooperative base station of a mobile base station according to location information and motion status of the mobile base station so as to cooperatively serve the user equipment, thus improving the quality of service for the user equipment.

BACKGROUND OF THE INVENTION

To cope with the demand for high communication capacity in future 5G Era, deploying small base stations densely in a city area (including on vehicles) to obtain enhanced system capacity is a critical technique for the solution of the problem, and small base stations and macro base stations which are densely deployed will constitute a multi-level heterogeneous network structure.

For a mobile small base station, a user equipment served by the mobile small base station will generally suffer from signal interference from a surrounding stationary base station. Coverage of a mobile base station is smaller than coverage of a stationary base station, and transmission power of the mobile base station is usually also smaller than transmission power of the stationary base station, which thus will cause a problem that a user equipment in the mobile base station is confronted with a selection of a surrounding stationary base station as a serving base station or that a user equipment in the mobile base station suffers from interference from the stationary base station. Meanwhile, due to the mobility characteristic of the mobile base station, such interference will vary along with different geographical locations, which makes the solution of the interference problem more complicated.

With regard to the problem of inter-cell interference, the prior art solves the interference problem between stationary base stations by methods such as multicast transmission (CoMP), resource dispatching and so on. Due to the mobility characteristic of mobile base stations, however, the simple application of the prior art methods will cause a problem that cell signaling overhead increases.

In addition, although the prior art already proposes a track prediction algorithm for an interference avoidance mechanism of a mobile base station, the main concept of the algorithm is: a mobile base station detects a nearby network environment at any moment, dynamically changes its own motion track, and avoids its own coverage from colliding with coverage of a stationary base station so as to avoid inter-cell interference. However, for cases where inter-cell collision is impossibly avoided, for example, for the case where a motion track of a mobile base station mounted on a vehicle (e.g., a subway train, a bus, etc.) is generally limited by a road such that it is impossible to avoid interference by changing the motion track, the prior art has not yet proposed any effective solution.

SUMMARY OF THE INVENTION

A brief summary of the present invention is given below to provide a basic understanding of some aspects of the present invention. It should be understood that the summary is not exhaustive; it does not intend to define a key or important part of the present invention, nor does it intend to limit the scope of the present invention. The object of the summary is only to briefly present some concepts, which serves as a preamble of the detailed description that follows.

In view of the foregoing problem, an object of at least one embodiment of the disclosure is to provide an electronic device and method in a mobile base station and an electronic device and method in a user equipment, which determine a cooperative base station of a mobile base station according to location information and motion status of the mobile base station so as to cooperatively serve the user equipment, thus improving the quality of service for the user equipment.

According to an aspect of the disclosure, there is provided an electronic device in a mobile base station, the electronic device comprising a processor configured to: instruct, based on a feature location in a predetermined set of feature locations, a user equipment served by the mobile base station to measure downlink channel quality of a detectable base station regarding the feature location; determine, according to a measurement result reported by the user equipment, a cooperative base station of the mobile base station regarding the feature location; and record the feature location in association with the cooperative base station in a database.

According to a preferred embodiment of the disclosure, the processor is further configured to repeatedly instruct the user equipment to measure the downlink channel quality of the detectable base station on a path between the feature location and a next feature location, and to determine the cooperative base station regarding the feature location according to the downlink channel quality fed back by the user equipment for many times.

According to another preferred embodiment of the disclosure, the processor is further configured to record one or more of current time, a road identifier and communication capacity in association with the cooperative base station in the database.

According to another preferred embodiment of the disclosure, the electronic device further comprises: a memory configured to store the database; and a communication unit configured to perform data reception and transmission operations.

According to another preferred embodiment of the disclosure, the processor is further configured to upload the database to a server and/or share the database with a neighboring mobile base station.

According to another preferred embodiment of the disclosure, the processor is further configured to periodically update the database according to creation time of each piece of data in the database.

According to another preferred embodiment of the disclosure, the processor is further configured to non-periodically update the database according to a predetermined trigger event.

According to another preferred embodiment of the disclosure, the predetermined trigger event comprises one or more of variation in communication capacity, variation in network topology structure and variation in physical environment.

According to another preferred embodiment of the disclosure, the processor is further configured to update the database by downloading from a server, by interacting with a neighboring mobile base station and/or by instructing the user equipment to perform the measurement.

According to another preferred embodiment of the disclosure, the predetermined set of feature locations is determined based on variation of a set of neighboring base stations of the mobile base station.

According to another preferred embodiment of the disclosure, the set of neighboring base stations is determined utilizing automatic neighbor relationship.

According to another preferred embodiment of the disclosure, the cooperative base station is a stationary base station.

According to another aspect of the disclosure, there is further provided an electronic device in a mobile base station, the electronic device comprising a processor configured to: predict, according to location information and motion status of the mobile base station, a movement location of the mobile base station; and search, according to the predicted movement location, a database in which location information is associated with cooperative base stations to select a cooperative base station regarding the movement location, thereby the selected cooperative base station and the mobile base station cooperatively serve a user equipment served by the mobile base station.

According to another aspect of the disclosure, there is further provided an electronic device in a user equipment, the electronic device comprising a processor configured to: measure, in response to an instruction from a mobile base station serving the user equipment, a downlink channel quality parameter of a detectable base station at a current location; and generate, based on the measured downlink channel quality parameter, a measurement report to be sent to the mobile base station, so that the mobile base station determines a cooperative base station according to the measurement report.

According to another aspect of the disclosure, there is further provided a method in a mobile base station, the method comprising: instructing, based on a feature location in a predetermined set of feature locations, a user equipment served by the mobile base station to measure downlink channel quality of a detectable base station regarding the feature location; determining, according to a measurement result reported by the user equipment, a cooperative base station of the mobile base station regarding the feature location; and recording the feature location in association with the cooperative base station in a database.

According to another aspect of the disclosure, there is further provided a method in a mobile base station, the method comprising: predicting, according to location information and motion status of the mobile base station, a movement location of the mobile base station; and searching, according to the predicted movement location, a database in which location information is associated with cooperative base stations to select a cooperative base station regarding the movement location, thereby the selected cooperative base station and the mobile base station cooperatively serve a user equipment served by the mobile base station.

According to another aspect of the disclosure, there is further provided a method in a user equipment, the method comprising: measuring, in response to an instruction from a mobile base station serving the user equipment, a downlink channel quality parameter of a detectable base station at a current location; and generating, based on the measured downlink channel quality parameter, a measurement report to be sent to the mobile base station, so that the mobile base station determines a cooperative base station according to the measurement report.

According to other aspects of the disclosure, there is further provided a computer program code and a computer program product for implementing the foregoing methods or functions of corresponding devices according to the disclosure, and a computer readable storage medium having stored thereon the computer program code for implementing the foregoing methods according to the disclosure. In addition, there is further provided a computer readable storage medium for carrying a database in which location information is associated with cooperative base stations according to the disclosure.

According to embodiments of the disclosure, even if in cases where inter-cell interference is impossibly avoided (e.g., a case where a movement track of a mobile base station on a vehicle is limited, etc.), it is still possible to select a cooperative base station from among surrounding base stations according to location information and motion status of the mobile base station so as to cooperatively serve a user equipment, thereby making it possible to decrease inter-cell interference suffered by the user equipment, thus improving the quality of service for the user equipment.

Other aspects of embodiments of the disclosure are given in the following specification part, wherein preferred embodiments for sufficiently disclosing the embodiments of the disclosure are described in detail, without applying limitations thereto.

BRIEF DESCRIPTION OF THE DRAWINGS

The disclosure could be better understood with reference to the detailed descriptions given below in combination with the appended drawings, wherein throughout the drawings, same or similar reference signs are used to represent same or similar components. The appended drawings together with the detailed descriptions below are included in the specification and form a part of the specification, to further describe preferred embodiments of the disclosure and explain the principles and advantages of the disclosure by way of examples. In the appended Drawings.

EMBODIMENTS OF THE INVENTION

Hereinafter, exemplary embodiments of the present invention will be described in detail combined with the appended drawings. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should be appreciated that although developing tasks are possibly complicated and time-consuming, such developing tasks are only routine tasks for those skilled in the art benefiting from the contents of the disclosure.

It should also be noted herein that, to avoid the disclosure from being obscured due to unnecessary details, only those device structures and/or processing steps closely related to the solution according to the disclosure are shown in the appended drawings, while omitting other details not closely related to the disclosure.

Embodiments of the disclosure will be described in detail with reference to FIG. 1 through FIG. 21 below.

It should be noted that, although for the sake of description, embodiments of the disclosure are described by taking interference between an in-vehicle mobile base station and a stationary base station in a scenario based on public traffic and heterogeneous network as an example in the detailed descriptions below, it should be understood that the disclosure is obviously not limited hereto, but may be similarly applied to any scenario where interference exists between a mobile base station and a surrounding base station, such as a scenario where interference exists between a mobile base station having an unlimited movement track and another mobile base station/a stationary base station and the like.

Figure 1:
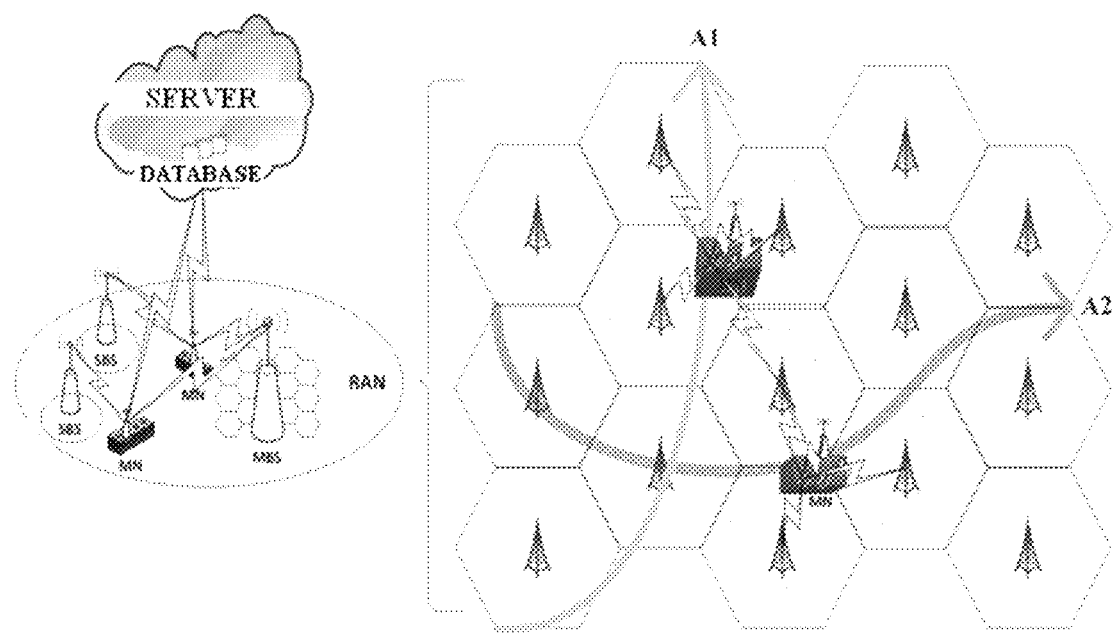
FIG. 1 is a schematic view showing a system model based on public traffic and heterogeneous network according to an embodiment of the disclosure.

FIG. 1 is a schematic view showing a system model based on public traffic and heterogeneous network according to an embodiment of the disclosure.

As shown in FIG. 1, in the system there are two in-vehicle mobile base stations (represented by MNs), which move along paths as indicated by an arrow A1 and an arrow A2 respectively and suffer from signal interference from surrounding small base stations (represented by SBSs) and macro base stations (represented by MBSs) respectively. It is assumed that all the small base stations and the macro base stations herein are stationary base stations. Both the mobile base stations MNs can communicate with an external database (for example, stored on a cloud server).

Figure 2:
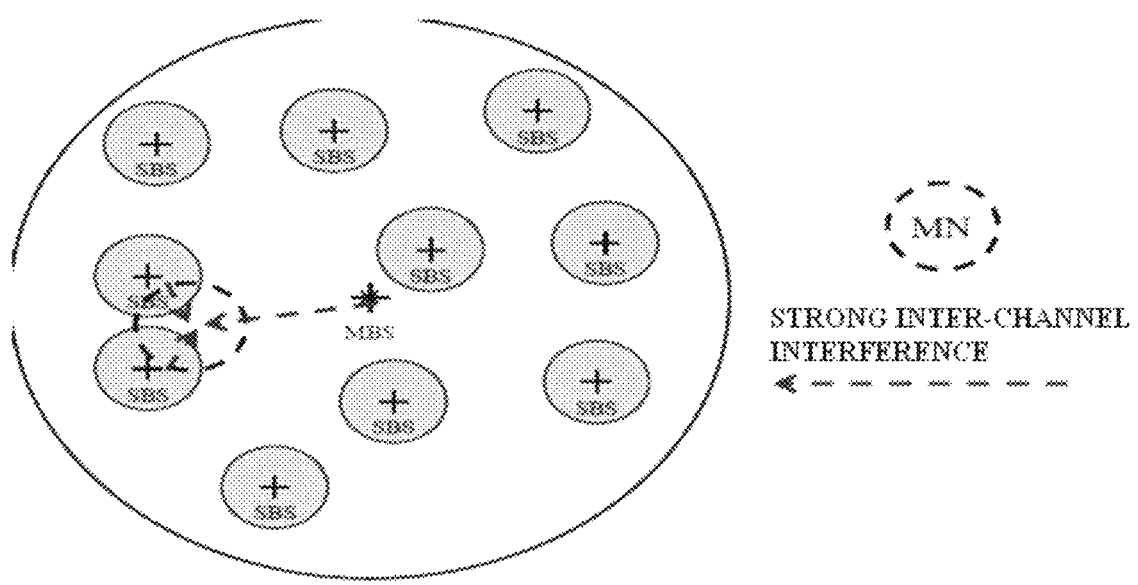
FIG. 2 is a schematic view showing an interference model in the system as shown in FIG. 1.

FIG. 2 is a schematic view showing an interference model in the system as shown in FIG. 1. As shown in FIG. 2, depending on a distribution condition of surrounding interfering base stations of the mobile base station MN in the movement process, the mobile base station MN will suffer from strong interference from different stationary base stations at different locations. In FIG. 2, the dashed arrow shows the strong interference suffered by the mobile base station MS at this time. As can be seen, the mobile base station suffers from interference from two surrounding small base stations SBSs and one surrounding macro base station MBS at this time. To reduce the influence of inter-cell interference upon a user equipment, incorporation of mobile base stations and stationary base stations producing strong interference to the user equipment at particular locations into a coordination set may be considered to cooperatively serve the user equipment (for example, to implement cooperative multicast transmission (CoMP) by techniques such as joint transmission, cooperative scheduling and the like, or to control interference by adopting techniques such as inter-cell interference coordination (eICIC)). The disclosure is carried out based on such a concept.

Figures 3, 4:
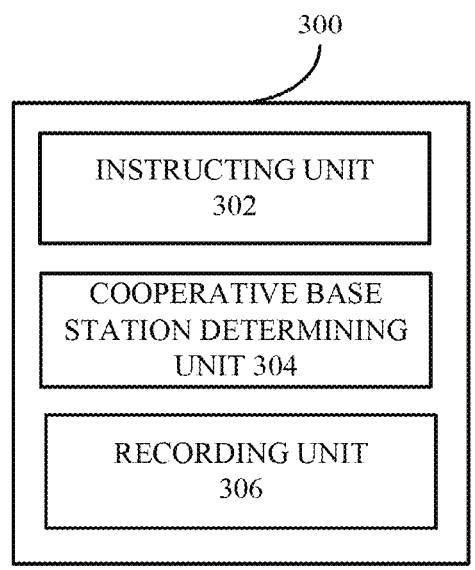
FIG. 3 is a block diagram showing a function configuration example of an electronic device in a mobile base station according to an embodiment of the disclosure.
FIG. 4 is a block diagram showing an example of a coordination reference table stored in a mobile base station according to an embodiment of the disclosure.

Next, a function configuration example of an electronic device in a mobile base station according to an embodiment of the disclosure will be described with reference to FIG. 3. FIG. 3 is a block diagram showing a function configuration example of an electronic device in a mobile base station according to an embodiment of the disclosure.

As shown in FIG. 3, an electronic device 300 according to the embodiment may include an instructing unit 302, a cooperative base station determining unit 304 and a recording unit 306.

The instructing unit 302 may be configured to instruct, based on a feature location in a predetermined set of feature locations, a user equipment served by the mobile base station to measure downlink channel quality of a detectable base station regarding the feature location.

Preferably, the set of predetermined feature locations herein is determined based on variation of a set of neighboring base stations of the mobile base station, the set of neighboring base stations for example may be determined utilizing automatic neighbor relationship (ANR); when the neighbor relationship of the mobile base station varies, i.e., when surrounding base stations vary in that a new base station comes into the neighbor relationship or a base station departs from the neighbor relationship, a location of the mobile base station at this time is recorded as a feature location. When the mobile base station moves to a next location, if its neighbor relationship again varies because a new base station enters into the neighbor relationship or a base station departs from the neighbor relationship, a new movement location is recorded as a feature location. The automatic neighbor relationship refers to the technique of configuring a reasonable and accurate neighbor relationship by automatically recognizing neighboring base stations and automatically detecting a neighbor relationship.

It could be understood that the neighboring base stations are usually base stations which are closer to the mobile base station and thus easily produce strong interference to the user equipment of the mobile base station. Thus in the movement process of the mobile base station, if the set of neighboring base stations of the mobile base station varies, the base stations producing strong interference to the mobile base station will also necessarily vary, that is, the cooperative base stations regarding the mobile base station will vary. Thus, any road and a movement track of the mobile base station can be extracted as a series of feature locations according to the variation of the set of neighboring base stations of the mobile base station; at the feature location, the set of neighboring base stations of the mobile base station varies, thus making it necessary herein to instruct the user equipment to measure downlink channel quality of a surrounding base station so as to determine a cooperative base station of the mobile base station. It should be understood that, the set of feature locations herein at least comprises locations where the set of neighboring base stations varies, or, according to requirements, may further comprise one or more locations between two adjacent locations where the set of neighboring base stations varies, for determining cooperative base stations at respective movement locations more accurately. Herein, for the sake of description, the embodiment of the disclosure is described by taking a set of the locations where the set of neighboring base stations varies as an example of the set of feature locations; however, it should be understood that the disclosure is obviously not limited hereto.

Accordingly, the user equipment can measure downlink channel quality of a surrounding detectable base station according to the received instruction, for example, can measure downlink channel quality of a surrounding base station by measuring one or more of Signal to Interference plus Noise Ratio (SINR), Reference Signal Receiving Power (RSRP) and Reference Signal Receiving Quality (RSRQ).

Preferably, since a cooperative base station regarding the mobile base station between two adjacent feature locations is generally invariable, the instructing unit 302 may be further configured to repeatedly instruct the user equipment to measure the downlink channel quality of the detectable base station on a path between the feature location and a next feature location, and to determine a cooperative base station regarding the feature location according to the downlink channel quality fed back by the user equipment for many times, so as to make a measurement result more accurate. The next feature location herein is generally determined according to a movement direction of the mobile base station at this time, and in a case where the movement direction is different, the next feature location regarding the feature location is also different.

Generally, a smaller value of a radius of coverage of a stationary base station may be selected to mark a distance between two locations, because the radius of the coverage of the stationary base station is the shortest distance over which the neighbor relationship of the mobile base station varies. Time needed by the mobile base station to pass through the segment of the path between the two locations can be obtained utilizing the value and a movement speed of the mobile base station. To select several stationary base stations whose quality of service is better in average on the path, repeated measurement may be performed for many times on the path, wherein the number of the times of the repeated measurement is set depending on specific environment, thereby making it possible to obtain an accurate value of a cycle of transmitting a measurement instruction to the user equipment. In addition, for adaptation to the requirements of a communication system, it is also necessary to perform rounding for a transmission time interval of the system, because for the communication system, the transmission time interval is the smallest time unit of the system; in this way, a transmission cycle of the measurement instruction can be obtained. The cycle is mainly influenced by the movement speed of the mobile base station. In a case of the same network environment, i.e., in a case where the coverage of the stationary base station is invariable while maintaining the same measurement accuracy, i.e., maintaining the number of the times of the repeated measurement invariable, the transmission cycle of the measurement instruction is shorter if the movement speed of the mobile base station is faster.

The cooperative base station determining unit 304 may be configured to determine, according to a measurement result reported by the user equipment, a cooperative base station of the mobile base station regarding the feature location. Preferably, for the case of the repeated measurement, the cooperative base station determining unit 304 may calculate an average value of results of multiple times of repeated measurement with respect to each stationary base station, so as to determine base stations whose downlink channel quality is better in average on the path between the two adjacent feature locations. It could be understood that, if the downlink channel quality of a stationary base station is better, it means that the stationary base station produces stronger interference to the user equipment; thus, the cooperative base station determining unit 304 may determine, as a cooperative base station of the mobile base station regarding the feature location, a stationary base station whose downlink channel quality is higher than a predetermined threshold or a predetermined number of stationary base stations whose uplink channel quality is ranked at the top.

It should be understood that the embodiment of the disclosure is described by taking the cooperative base stations which are stationary base stations as an example herein for the following reason: it is generally regarded that a mobile base station has smaller transmission power since it only serves a user equipment within a smaller range, and thus interference between mobile base stations is generally smaller; moreover, mobile base stations are always moving, and thus according to the technology of the disclosure, it is possibly infeasible to incorporate mobile base stations into a relatively stationary coordination set so as to perform a cooperative service. However, the cooperative base stations of course are not limited only to the stationary base stations. For example, with regard to two mobile base stations having substantially consistent movement tracks, the two mobile base stations may also be considered as cooperative base stations if strong interference exists between the two base stations.

Then, the recording unit 306 may be configured to record the feature location in association with the cooperative base station in a database. A storage form of data in the database for example may be a table. The table herein for example may be called a Coordination Reference Table (CRT). Preferably, the recording unit 306 may also record one or more of current time, a road identifier and communication capacity in association with the cooperative base station in the database. It should be understood that, the storage form of the data in the database is not limited to the table, and any database implementation form capable of storing location information in association with cooperative base station information is applicable to the present invention.

The electronic device 300 may further comprise a memory configured to store the database. Accordingly, the mobile base station can store for example its CRT to the memory of itself before shutdown, for reading and use after startup. This is because that in actual environment, a running track of a vehicle carrying a mobile base station is highly repeated and fixed in general cases; for example, a mobile base station such as a bus, a railway, a private car commuting between a home and a company and the like repeatedly runs on a substantially fixed track, and thus it is very helpful to save a CRT backup of its own. In this way, it is made possible to not only reduce overhead for a selection process of a cooperative base station but also reduce overhead for making a request to a server and downloading related data. In addition, even if network connectivity is affected such that downloading is impossible, the backup of the mobile base station itself still can be used, thus improving the operating efficiency and the reliability of the system. FIG. 4 is a block diagram showing an example of a coordination reference table stored in a mobile base station according to an embodiment of the disclosure.

As shown in FIG. 4, the coordination reference table stored in the mobile base station is based on a movement track of the mobile base station, and it includes multiple portions divided according to a road identifier. "Road Number" is used for identifying roads to which respective locations belong, which is also advantageous to subsequent aggregation and sharing of information in the table; "Location Information" represents the above feature location; "Creation Time" represents creation time of the piece of data, thus making it possible to determine, according to current time and creation time and a predetermined survival cycle, whether or not the piece of data is valid for data update; and "Selected Base Station" represents a cooperative base station to be selected at the current location.

In the table as shown in FIG. 4, preferably, different cooperative base stations are also discriminatively selected according to the magnitude of communication capacity. Specifically for example, it is assumed that: for a business district, at working hours (e.g., 8:00-18:00) a peak of communication capacity is exhibited and accordingly transmission power of stationary base stations is higher, and at afterwork hours (e.g., 18:0 to 8:00 in the next morning) a valley of communication capacity is exhibited and accordingly transmission power of some stationary base stations will be reduced to save energy. Thus, as communication capacity is different, a cooperative base station selected at the same location is also possibly different. As exemplary implementation, when a mobile base station moves to a certain location, for example it can be substantially judged according to current time whether the current time is a peak period of communication capacity or is a valley period of communication capacity, so as to select an appropriate cooperative base station by searching the stored table.

It should be understood that, the form of the coordination reference table as shown in FIG. 4 is only exemplary, and those skilled in the art can also design different data storage forms of the database according to actual requirements, as long as the database at least records location information in association with respective cooperative base stations.

In addition, preferably, the recording unit 306 may also upload the database to a server (for example, a cloud data control center, etc.). Accordingly, the server can collect table data uploaded by the respective mobile base stations and organize the table data and thereafter construct a road-based coordination reference table, such that another mobile base station which subsequently enters the system or another mobile base station storing a coordination reference table in which data is invalid can acquire related data from the server to determine a cooperative base station.

Figure 5:
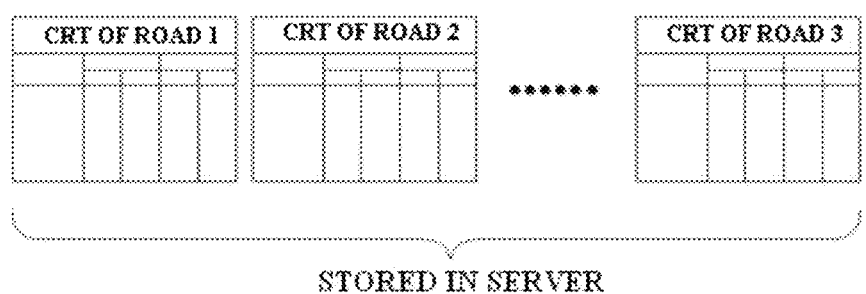
FIG. 5 is a block diagram showing an example of a coordination reference table stored in a server according to an embodiment of the disclosure.

FIG. 5 is a block diagram showing an example of a coordination reference table stored in a server according to an embodiment of the disclosure.

As shown in FIG. 5, the coordination reference table stored in the server aggregates the table data uploaded by the respective mobile base stations, and is divided into multiple sub-tables according to a road identifier (such as Road 1, Road 2, Road 3 and the like); in each sub-table, similarly to the coordination reference tables stored in the respective mobile base stations, each piece of data includes location information, creation time and a selected base station distinguished by the magnitude of communication capacity.

By classifying table information according to a road identifier, if a vehicle enters a certain road and will run for a period of time along the road, a mobile base station on the vehicle can download all the data information of the road to which the current location belongs to the local according to the location, such that corresponding data can be queried from the local when it is next necessary to vary a cooperative base station, thus avoiding communication capacity and time consumed each time data is downloaded from the server, making it possible to improve system efficiency.

Similarly, it could be understood that, the table form as shown in FIG. 5 is only exemplary but not limitative, and those skilled in the art can also appropriately change the form of the table according to the principle of the disclosure.

Figure 6:
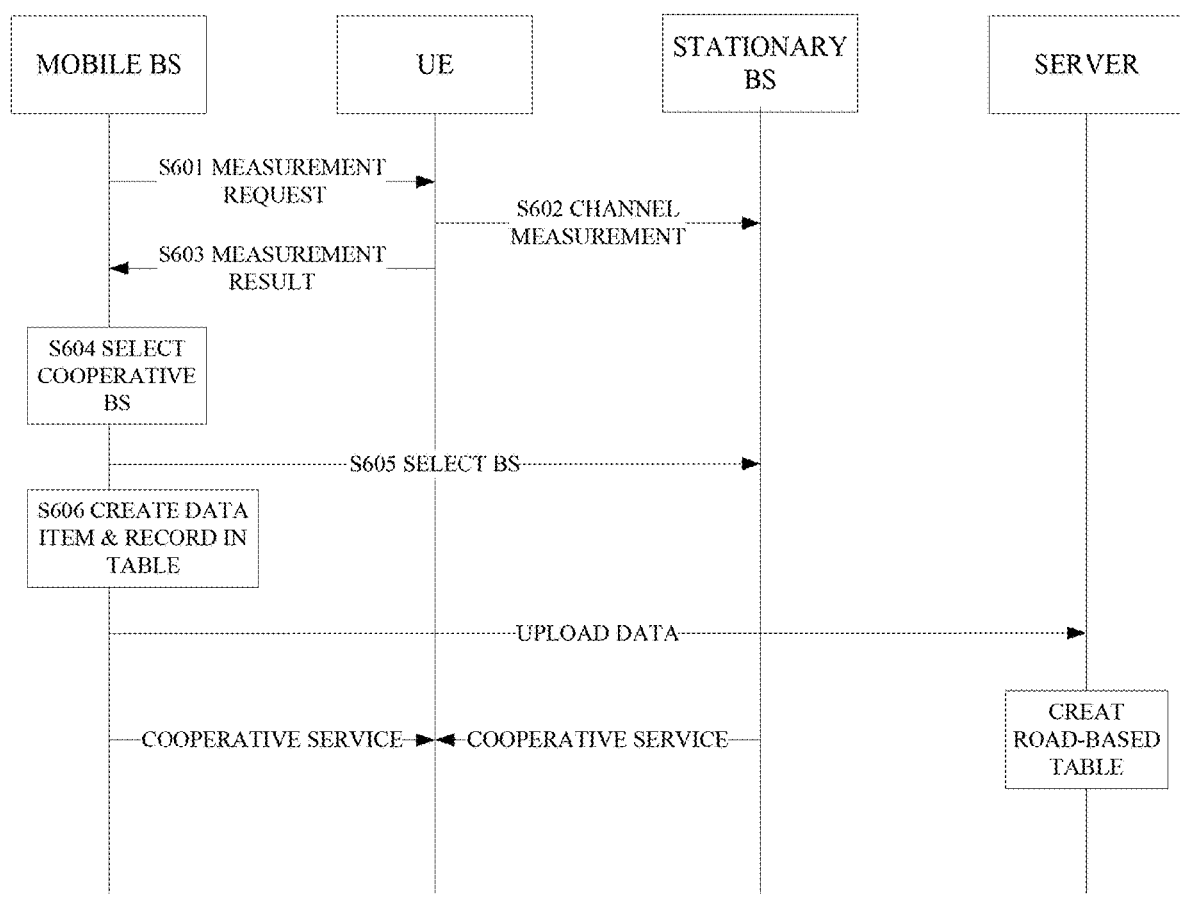
FIG. 6 is a flowchart showing a signaling interaction process for creating a coordination reference table by a mobile base station according to an embodiment of the disclosure.

To facilitate the understanding to the above process, a signaling interaction process concerning how a mobile base station creates a coordination reference table will be described in detail with reference to FIG. 6 below. FIG. 6 is a flowchart showing a signaling interaction process for creating a coordination reference table by a mobile base station according to an embodiment of the disclosure.

As shown in FIG. 6, first, in step S601, a mobile base station sends a measurement request to a user equipment, so as to indicate the user equipment to measure downlink channel quality of a surrounding detectable base station.

Then, in step S602, the user equipment determines downlink channel quality of a surrounding stationary base station by measuring SINR, RSRP and/or RSRQ thereof, and in step S603, a corresponding measurement result is reported to the mobile base station. Then, in step S604, the mobile base station selects corresponding cooperative base stations according to channel quality of the respective stationary base stations and a predetermined criterion, and in step S605, corresponding stationary base stations are notified for example through air interface communication to join in a coordination service. Next, in step S606, the mobile base station records the determined cooperative base station in association with related location information as data items in the coordination reference table. At the time of shutdown, the mobile base station can store the related data into a local memory and upload the related data to a server, such that the server can organize and aggregate the data so as to create a road-based coordination reference table. Accordingly, the mobile base station together with the determined cooperative base station can cooperatively serve the user equipment when it moves to the location.

In addition, it is also possible to share data between mobile base stations. That is, the recording unit 306 may also share a database (i.e., a coordination reference table) of neighboring, another mobile base station with the neighboring, another mobile base station.

For example, a definition may be made in such a manner that a priority for a mobile base station to acquire table information from neighboring, another mobile base station is lower than a priority for the mobile base station to acquire table information from a server. In this way, it is made possible to increase the redundancy of the system, thus improving the validity of the system. Specifically, when the mobile base station cannot download data from the server, the mobile base station may be called a link broken mobile base station; at this time, the link broken mobile base station broadcasts a data request to neighboring mobile base stations according to the current location, and mobile base stations which receive the request and query the data return related data to the link broken mobile base station; the link broken mobile base station receives and organizes the data, and maintains only the latest data for the same table item. Preferably, the link broken mobile base station may again return the data having been organized to the mobile base stations which return the data to it, such that these mobile base stations can update their own table data to a limited extent utilizing the data.

Figure 7:
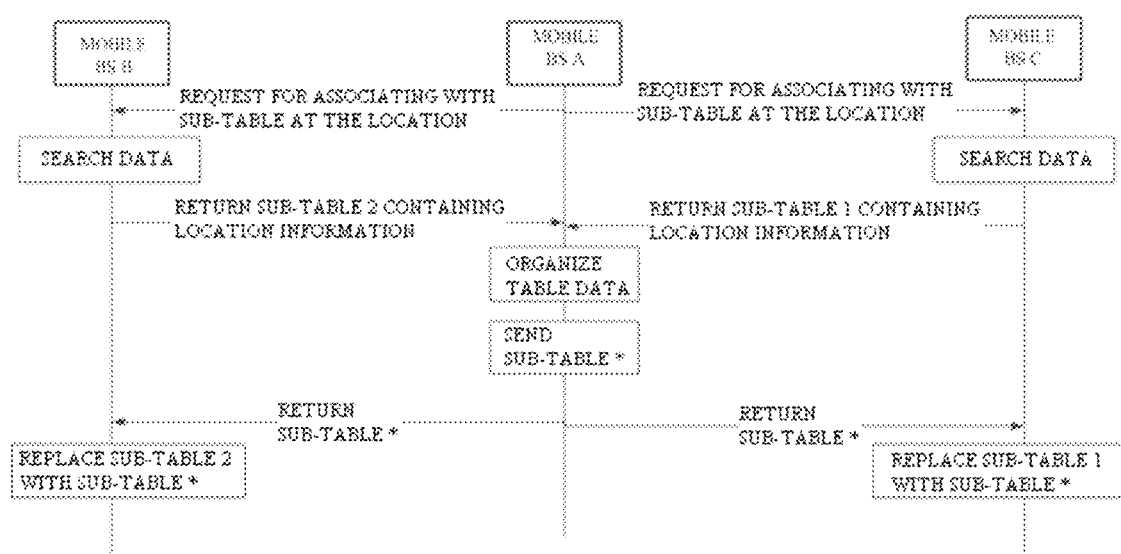
FIG. 7 is a flowchart showing a signaling interaction process for sharing a coordination reference table between mobile base stations according to an embodiment of the disclosure.

FIG. 7 is a flowchart showing a signaling interaction process for sharing a coordination reference table between mobile base stations according to an embodiment of the disclosure.

In the example as shown in FIG. 7, it is assumed that a mobile base station A is a link broken mobile base station and that both a mobile base station B and a mobile base station C have data needed by the mobile base station A. As shown in FIG. 7, first, the mobile base station A broadcasts a request for cooperative base station data regarding a particular location to neighboring mobile base stations. Then, the mobile base stations B and C which receive the request respectively search the respective tables stored by them to acquire data regarding the particular location, and respectively return a sub-table 1 and a sub-table 2 containing the data regarding the particular location to the mobile base station A; the mobile base station A organizes the sub-tables respectively received from the mobile base station B and the mobile base station C to generate a sub-table*, and returns the sub-table* to the mobile base stations B and C, such that the mobile base stations B and C can update the respective sub-table 1 and sub-table 2 utilizing the received sub-table*.

It should be understood that the signaling interaction process as shown in FIG. 7 is only exemplary but not limitative, and those skilled in the art can modify it according to specific implementation requirements. For example, the process in which the mobile base station A returns the sub-table* having been organized to the mobile base stations B and C is optional.

Figure 8:
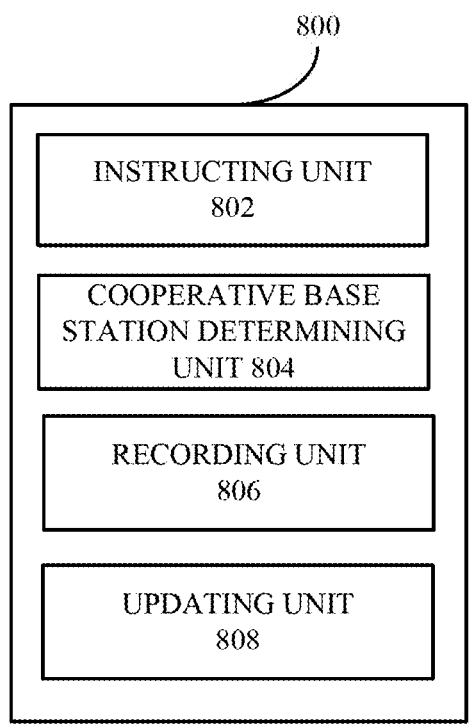
FIG. 8 is a block diagram showing another function configuration example of an electronic device in a mobile base station according to an embodiment of the disclosure.

FIG. 8 is a block diagram showing another function configuration example of an electronic device in a mobile base station according to an embodiment of the disclosure.

As shown in FIG. 8, an electronic device 800 according to the embodiment may comprise an instructing unit 802, a cooperative base station determining unit 804, a recording unit 806 and an updating unit 808, wherein function configurations of the instructing unit 802, the cooperative base station determining unit 804 and the recording unit 806 are substantially the same as the function configurations of the instructing unit 302, the cooperative base station determining unit 304 and the recording unit 306 described above with reference to FIG. 3, respectively, and will not be repeatedly described herein. Only a function configuration example of the updating unit 808 will be detailed in detail below.

The updating unit 808 may be configured to periodically update a database according to creation time of each piece of data in the database Specifically, as stated above, it is assumed that each piece of data has a predetermined survival cycle, then the updating unit 808 can judge, according to creation time of each piece of data and current time, whether or not survival time of the data has exceeded the predetermined survival cycle, and if it exceeds the survival cycle, it is demonstrated that the piece of data has been invalid, thus making it necessary to update the data in the database. In this way, it is made possible to ensure the timeliness of the data in the database, so as to cope with variation in network environment, thus appropriately selecting an optimal cooperative base station.

Alternatively or additionally, it is also possible to non-periodically update the database according to a predetermined trigger event. The triggering event herein for example may include one or more of variation of communication capacity (e.g., a tidal effect of communication capacity), variation of network topological structure (e.g., connection of a new base station to a network, etc.), and variation of physical environment (e.g., variation of road environment, etc.).

When performing an update of the data in the database, the updating unit 808 may be configured to perform the update by downloading from a server and/or interacting with a neighboring mobile base station as described above. Alternatively or additionally, if the data does not exist in the server and/or the neighboring mobile base station or the data has been invalid, the updating unit 808 may also determine a cooperative base station regarding a related location by instructing a user equipment to measure downlink channel quality of all stationary base stations detectable at the location, and record related data in the database to perform the update.

It should be noted that, the respective function units in the electronic devices 300 and 800 described above are only logic function modules divided according to the specific functions implemented by them, but are not used for limiting a specific implementation manner. During the actual implementation, the above respective function units may be realized as independent physical entities, or may also be realized by individual entities (such as a processor (a CPU or a DSP or the like), an integrated circuit or the like).

In addition, it should also be noted that the above electronic devices 300 and 800 may be realized in chip level or may also be realized in device level by including other external components. For example, the electronic devices 300 and 800 may also operate as mobile base stations, which further include corresponding communication units (e.g., a transceiver, etc.) for performing data receiving and transmission operations.

An embodiment concerning how to create and maintain a coordination reference table has been described above with reference to FIG. 3 through FIG. 8. An embodiment concerning how a mobile base station selects a corresponding cooperative base station according to the above created coordination reference table to cooperatively serve the user equipment in the actual application will be described with reference to FIG. 9 below.

Figure 9:
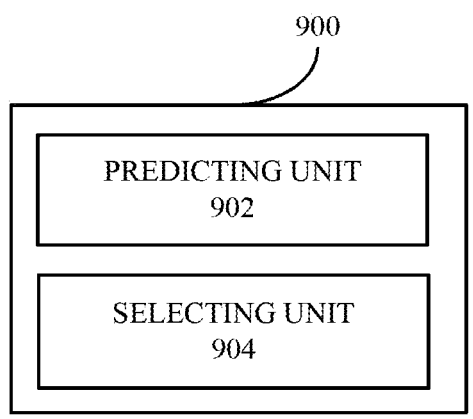
FIG. 9 is a block diagram showing a function configuration example of an electronic device in a mobile base station according to another embodiment of the disclosure.

FIG. 9 is a block diagram showing a function configuration example of an electronic device in a mobile base station according to another embodiment of the disclosure.

As shown in FIG. 9, an electronic device 900 according to the embodiment may comprise a predicting unit 902 and a selecting unit 904. It should be noted that, the respective function units described herein are only logic function modules divided according to the specific functions implemented by them, but are not used for limiting a specific implementation manner. During the actual implementation, the above respective function units may be realized as independent physical entities, or may also be realized by individual entities (such as a processor (a CPU or a DSP or the like), an integrated circuit or the like).

The predicting unit 902 may be configured to predict, according to location information and motion status of the mobile base station, a movement location of the mobile base station. Specifically, the predicting unit 902 may determine current location coordinates of the mobile base station according to a positioning system (e.g., a Global Positioning System (GPS)), and predict a movement location of the mobile base station according to movement speed and direction and the like at this time.

The selecting unit 904 may be configured to search, according to the predicted movement location, a database in which location information is associated with cooperative base stations to select a cooperative base station regarding the movement location, thereby the selected cooperative base station and the mobile base station cooperatively serve a user equipment served by the mobile base station.

The database may be stored in a memory of the electronic device 900, in a Data Control Center (DCC) as a server and/or in a neighboring mobile base station. Specifically, in a case were the database is not stored at the local, the selecting unit 904 may first download related database data to the local by downloading from a server and/or interacting with a neighboring mobile base station, and then perform searching at the local.

Specifically, the selecting unit 904 may first search for the predicted movement location in the database stored at the local; if the data does not exist in the local database or the data has been invalid, a request for downloading a related database may be made to the server, and if it is impossible to download from the server (for example, it is impossible to connect to the server or the related data is absent in the server or the data has been invalid), a request for sharing the related data may be made to the neighboring mobile base station. If it is also impossible to acquire the related data from the neighboring mobile base station (for example, the data does not exist or has been invalid), i.e., if the predicted movement location does not exist in the database having been created or the existing data has been invalid, the selecting unit 904 may instruct a user equipment to measure downlink channel quality of a detectable base station regarding the movement location, so as to determine a cooperative base station regarding the movement location according to a measurement result from the user equipment, and record the determined cooperative base station in association with the movement location in the database. The process concerning how to instruct the user equipment to measure downlink channel quality of a surrounding detectable base station so as to determine a cooperative base station is substantially the same as the process described above with reference to FIG. 3 through FIG. 8, and will not be repeatedly described herein.

Figure 10:
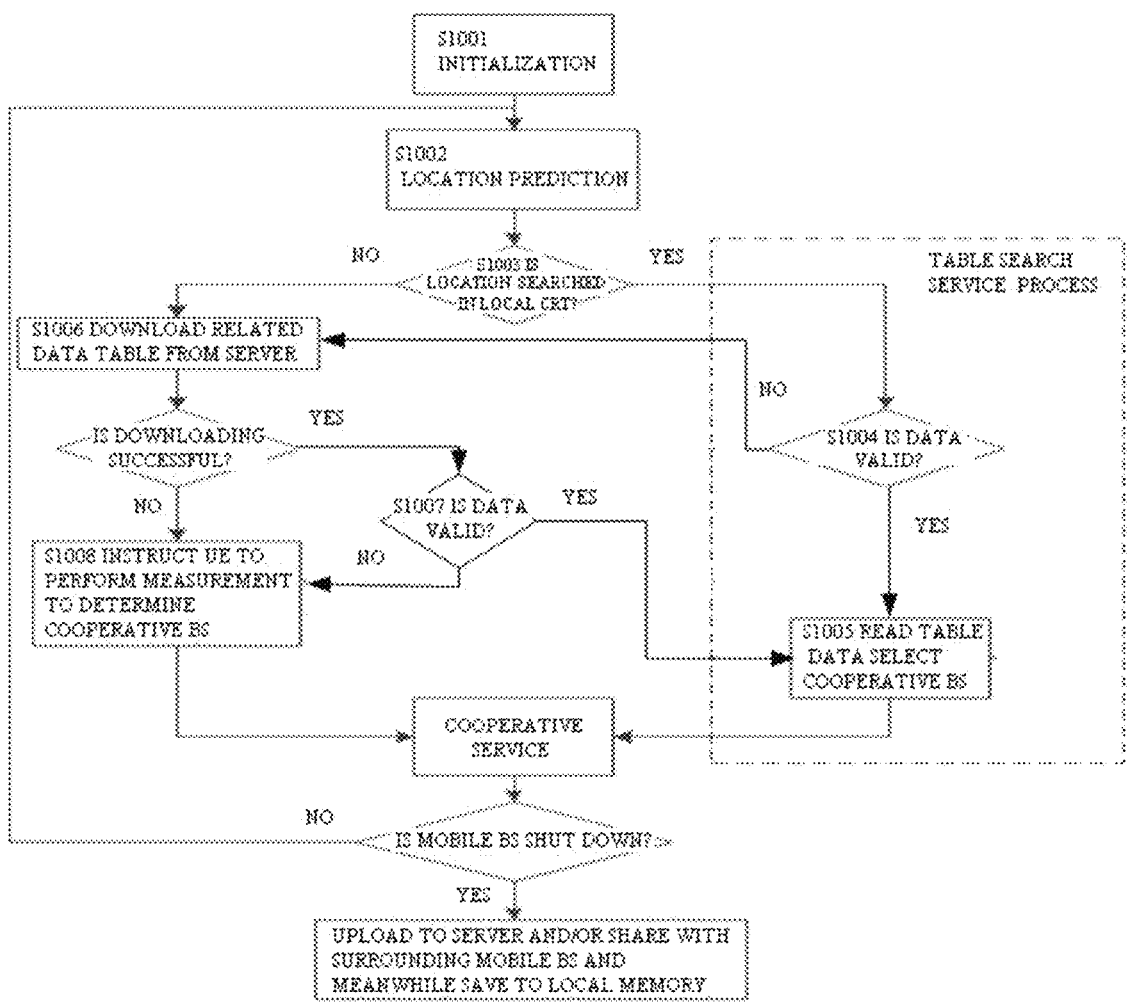
FIG. 10 is a flowchart showing a process example for determining a cooperative base station by applying the technology according to an embodiment of the disclosure such that a mobile base station and the cooperative base station cooperatively serve a user equipment.

To facilitate the understanding to a process concerning how a mobile base station selects a cooperative base station according to a coordination reference table obtained in the above manner to cooperatively serve a user equipment in the actual application, the process will be described in detail with reference to the flowchart as shown in FIG. 10 below. FIG. 10 is a flowchart showing a process example for determining a cooperative base station by applying the technology according to an embodiment of the disclosure such that a mobile base station and the cooperative base station cooperatively serve a user equipment.

As shown in FIG. 10, first, in step S1001, the mobile base station is started up to perform initialization. The initialization process comprises reading, by the mobile base station, a coordination reference table created previously according to historical movement records. Then, in step S1002, the mobile base station predicts a next movement location according to its current location and movement status (including movement speed, movement direction, etc.); moreover, in step S1003, the mobile base station searches for the predicted movement location in the local coordination reference table, and if the location exists in the local coordination reference table, a table search service process is entered. In the table search service process, in step S1004, the mobile base station judges whether or not data in the local coordination reference table regarding the movement location is valid; if the data is the latest, the mobile base station selects a corresponding cooperative base station by reading table data in step S1005, so as to cooperatively serve the user equipment by cooperative transmission techniques such as CoMP technique or eICIC technique or the like, thus improving the quality of service for the user equipment. On the other hand, if the predicted location is not searched in the step S1003 or it is judged in the step S1004 that the local data has been invalid, the mobile base station downloads a table containing data regarding the predicted location from the server in step S1006; moreover, in a case where the downloading is successful, it is judged in step S1007 whether or not the downloaded data is valid, and if the data is valid, the method proceeds to the step S1005, so as to perform a cooperative service by reading the table data. On the other hand, if the downloading is not successful (for example, it is impossible to successfully connect to the server or the coordination reference table stored by the server does not include the data regarding the predicted location) and/or it is judged in the step S1007 that the downloaded data has been invalid, in step S1008 the mobile base station may instruct the user equipment to perform related measurement to determine a cooperative base station to be selected at the predicted location so as to cooperatively serve the user equipment. For the specific implementation process for instructing the user equipment to perform measurement to determine a cooperative base station in the step S1008, reference may be made to the process described above with reference to the flowchart as shown in FIG. 6, and detailed descriptions will not be made in detail herein. Then, the mobile base station can record the determined cooperative base station in association with the predicted location in the local coordination reference table, and upload the updated coordination reference table to the server and/or the surrounding mobile base station to perform sharing.

Below, examples of signaling interaction processes in cases where downloading of a coordination reference table from a server is successful and fails will be exemplarily described in detail with reference to FIG. 11 and FIG. 12 in combination with the flowchart as shown in FIG. 10.

Figure 11:
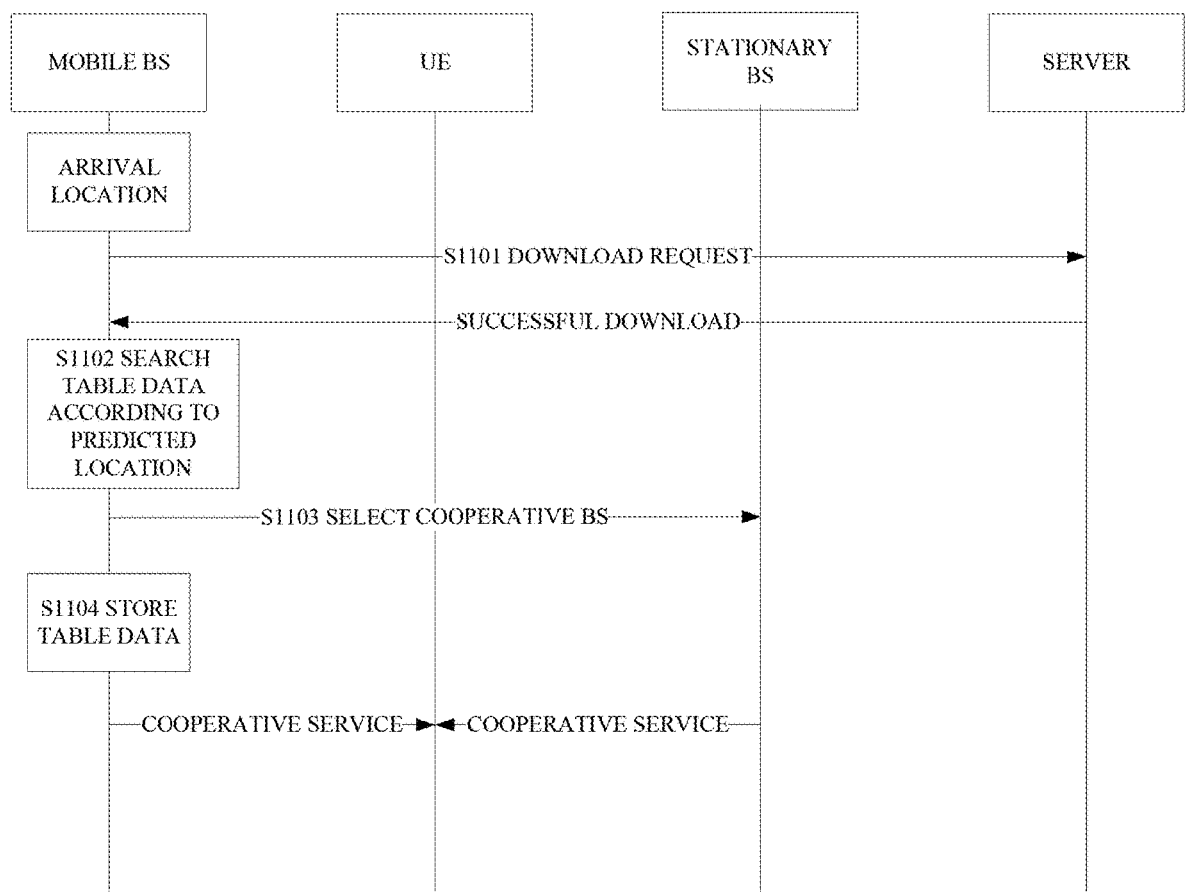
FIG. 11 is a flowchart showing an example of a signaling interaction process in a case where downloading of a coordination reference table from a server is successful.

FIG. 11 is a flowchart showing an example of a signaling interaction process in a case where downloading of a coordination reference table from a server is successful. Herein, it is assumed that data downloaded from the server is valid.

As shown in FIG. 11, in step S1101, the mobile base station sends a download request to the server according to the predicted movement location, and in a case where downloading is successful, in step S1102 related data is searched in the downloaded table according to the predicted movement location. Then, in step S1103, a corresponding cooperative base station is selected according to the searched data, and in step S1104, the mobile base station stores the data in its local table. Then, the mobile base station together with the determined cooperative base station serves the user equipment.

It should be understood that, the signaling interaction process as shown in FIG. 11 is only exemplary but not limitative, and those skilled in the art can modify the above process according to the principle of the disclosure and actual requirements. For example, although in FIG. 11 it is assumed that the data downloaded from the server is valid, it is actually also possible to judge whether or not related data is valid after the data is searched in step S1102; if it is valid, operations in the steps S1103 and S1104 are performed, and otherwise, a self-learning table creation process may be entered; that is, the mobile base station instructs the user equipment to measure downlink channel quality of a surrounding base station to determine a cooperative base station. For the specific implementation of the self-learning table creation process, reference may be made to the signaling interaction process described above with reference to FIG. 6, and detailed descriptions will not be made in detail herein. Alternatively, in a case where the data is invalid, the mobile base station may also first send a broadcast to a surrounding base station to request for sharing related data, and if the sharing fails or the data stored in the surrounding mobile base station is invalid, the self-learning table creation process is then entered to determine a cooperative base station.

Figure 12:
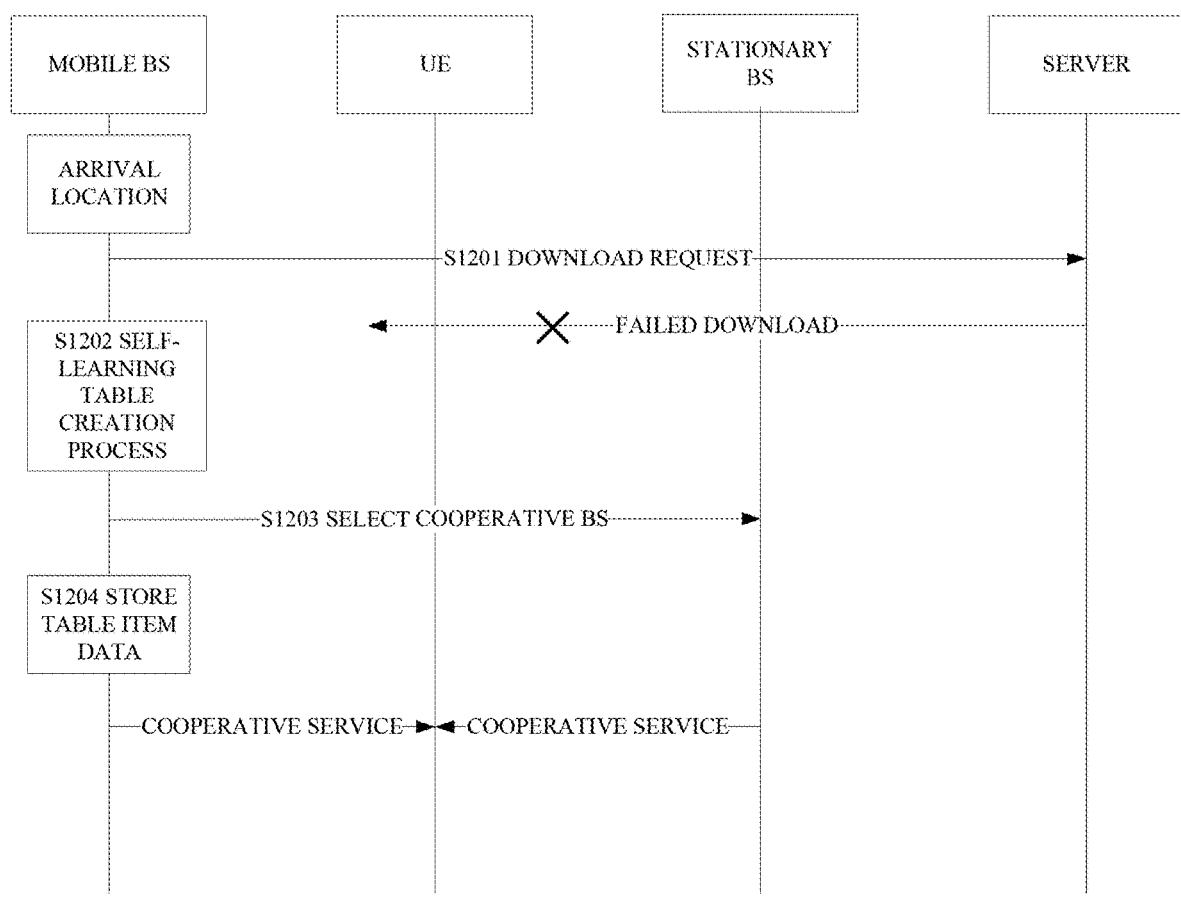
FIG. 12 is a flowchart showing an example of a signaling interaction process in a case where downloading of a coordination reference table from a server fails.

FIG. 12 is a flowchart showing an example of a signaling interaction process in a case where downloading of a coordination reference table from a server fails.

As shown in FIG. 12, in step S1201, the mobile base station sends a download request to the server according to the predicted movement location, and in a case where downloading fails, in step S1202 the mobile base station enters a self-learning table creation process. For the specific implementation process of the self-learning table creation process, reference may be made to the signaling interaction process described above with reference to FIG. 6, and detailed descriptions will not be made in detail herein. Accordingly, the mobile base station together with the determined cooperative base station can serve the user equipment. Then, in step S1203, a cooperative base station is selected, and in step S1204, the determined data is stored in the local table. Accordingly, the determined cooperative base station together with the mobile base station cooperatively serves the user equipment.

It should be understood that, the signaling interaction process as shown in FIG. 12 is only exemplary but not limitative, and those skilled in the art can modify the above process according to the principle of the disclosure and actual requirements. For example, similarly, in a case where downloading fails, instead of directly entering the self-learning table creation process in the step S1202, the mobile base station may also first send a broadcast to a surrounding base station to request for sharing related data, and if the sharing fails or the data stored in the surrounding mobile base station is invalid, the self-learning table creation process in the step S1202 is then entered.

In addition, it should also be understood that, the flowchart as shown in FIG. 10 is only an exemplary implementation manner of the technology of the disclosure, and those skilled in the art of course may modify the implementation according to the principle of the disclosure and actual requirements. For example, in a case where the local data is invalid, the mobile base station may also not request for related data to the server, but directly instruct a user equipment served by the mobile base station to perform measurement so as to determine a cooperative base station, or may also first request for data to the server, and then perform interaction with a surrounding mobile base station to acquire related data if it is impossible to acquire related data from the server; moreover, if it is impossible to acquire data from the surrounding mobile base station or the data has been invalid, the self-learning table creation process is then entered. Also for example, in the case where it is impossible to acquire related data from the server, as stated above, instead of directly instructing a user equipment served by the mobile base station to perform measurement so as to determine a cooperative base station, it is possible to first request for sharing data to the surrounding mobile base station, and then instruct the user equipment to perform measurement if the sharing fails or the data is invalid.

It should be noted that the electronic device as shown in FIG. 9 may be realized in chip level or may also be realized in device level by including other external components. For example, the electronic device 900 may also operate as a mobile base station, which further includes a corresponding communication unit (e.g., a transceiver, etc.) for performing data receiving and transmission operations.

In addition, it should also be noted that, although function configuration examples of electronic devices in the case of creating and maintaining a coordination reference table have been described above with reference to FIG. 3 and FIG. 8 and a function configuration example of an electronic device in the case of actually applying the created coordination reference table to select a cooperative base station to perform a cooperative service has been described with reference to FIG. 9, these are only descriptions made separately to facilitate the understanding to the technology of the disclosure. In the actual application, electronic devices in a mobile base station will not be discriminated as being used for creating and maintaining a coordination reference table and for applying created coordination reference table to select a cooperative base station, respectively; that is, any electronic device in a mobile base station can simultaneously implement the functions of the above electronic devices as shown in FIG. 3, FIG. 8 and FIG. 9. That is, the above respective embodiments may be combined with each other.

Figure 13:
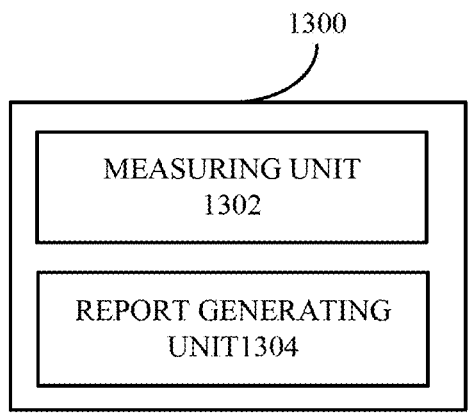
FIG. 13 is a block diagram showing a function configuration example of an electronic device in a user equipment according to an embodiment of the disclosure.

In correspondence to the electronic devices in the mobile base station described above, there is further disclosed an embodiment of an electronic device in a user equipment. A function configuration example of an electronic device in a user equipment according to an embodiment of the disclosure will be described with reference to FIG. 13 below. FIG. 13 is a block diagram showing a function configuration example of an electronic device in a user equipment according to an embodiment of the disclosure.

As shown in FIG. 13, an electronic device 1300 according to the embodiment may comprise a measuring unit 1302 and a report generating unit 1304. It should be noted that, the respective function units described herein are only logic function modules divided according to the specific functions implemented by them, but are not used for limiting a specific implementation manner. During the actual implementation, the above respective function units may be realized as independent physical entities, or may also be realized by individual entities (such as a processor (a CPU or a DSP or the like), an integrated circuit or the like).

The measuring unit 1302 may be configured to measure, in response to an instruction from a mobile base station serving the user equipment, a downlink channel quality parameter of a detectable base station at a current location. The downlink channel quality parameter herein may comprise one or more of SINR, RSRP and RSRQ.

Specifically, as stated above, when the mobile base station is required to initiatively determine a cooperative base station at a particular location, the mobile base station will send a measurement request to its user equipment, to instruct the user equipment to measure downlink channel quality of a surrounding detectable base station, and a user equipment which receives an instruction will perform measurement utilizing the method in the part art.

The report generating unit 1304 may be configured to generate, based on the measured downlink channel quality parameter, a measurement report to be sent to the mobile base station, so that the mobile base station can determine a cooperative base station based on a predetermined rule according to the received measurement report regarding respective surrounding base stations so as to perform a cooperative service.

The electronic device as shown in FIG. 13 may be realized in chip level, or may also be realized in device level by including other external components. For example, the electronic device 1300 may also operate as a user equipment, which further includes a corresponding communication unit (e.g., a transceiver, etc.) for performing data receiving and transmission operations.

It should be understood that, the embodiment of the electronic device in the user equipment described with reference to FIG. 13 herein corresponds to the above embodiment of the electronic device in the mobile base station; thus for contents not described in detail herein, reference may be made to the corresponding descriptions in the above embodiment, and repeated descriptions will not be made herein.

In correspondence to the above device embodiments, the disclosure further provides the following method embodiments. The method embodiments according to the disclosure will be described with reference to FIG. 14 through FIG. 16 below, respectively.

Figure 14:
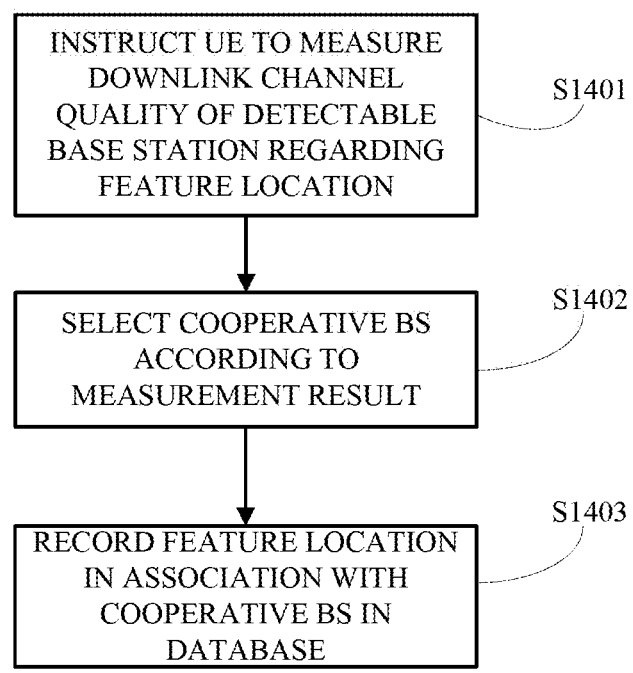
FIG. 14 is a flowchart showing a process example of a method in a mobile base station according to an embodiment of the disclosure.

FIG. 14 is a flowchart showing a process example of a method in a mobile base station according to an embodiment of the disclosure.

As shown in FIG. 14, the method starts from step S1401. In the step S1401, the mobile base station instructs, based on a feature location in a predetermined set of feature locations, a user equipment served by the mobile base station to measure downlink channel quality of a detectable base station regarding the feature location. The predetermined set of feature locations may be determined based on variation of a set of neighboring base stations of the mobile base station. The set of neighboring base stations may be determined utilizing automatic neighbor relationship. That is, at least at a location where the set of neighboring base stations varies, the mobile base station is required to instruct a user equipment to perform measurement, so as to determine a cooperative base station at the location.

Preferably, between two adjacent feature locations, to make a measurement result more accurate to select a more appropriate cooperative base station, the mobile base station may repeatedly instruct a user equipment to perform measurement, according to its movement speed and a cell radius of a surrounding base station and current network condition, to determine a base station whose average quality is better (i.e., which produces stronger interference) within the path range as a cooperative base station.

Then, the method proceeds to step S1402. In the step S1402, the mobile base station determines, according to a measurement result reported by the user equipment, a cooperative base station of the mobile base station regarding the feature location.

Next, the method proceeds to steps S1403. In the step S1403, the mobile base station records the feature location in association with the cooperative base station in a database. The database may be stored in a memory of the mobile base station, and the mobile base station may also upload the database to a server and/or share the database with a neighboring mobile base station.

Preferably, the mobile base station may also periodically and/or non-periodically update the database by downloading from a server, interacting with a neighboring mobile base station and/or performing the above measurement.

It should be understood that, the method embodiment described herein corresponds to the embodiment of the electronic device in the mobile base station described above with reference to FIG. 3 through FIG. 8; thus for contents not described in detail herein, reference may be made to the above corresponding descriptions, and repeated descriptions will not be made herein.

Figure 15:
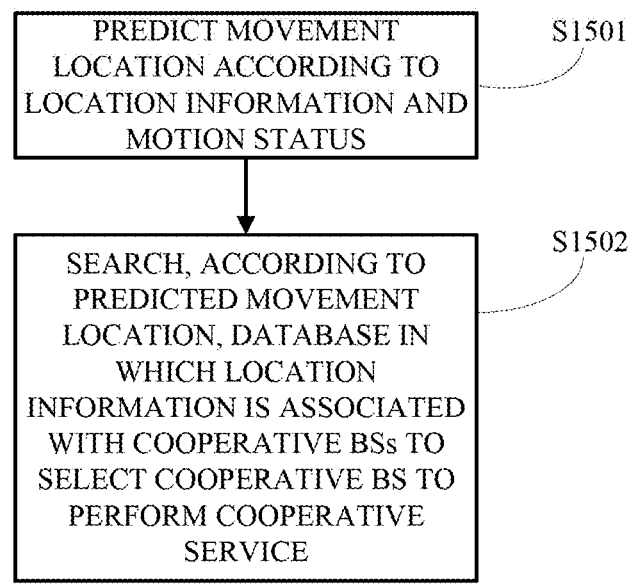
FIG. 15 is a flowchart showing a process example of a method in a mobile base station according to another embodiment of the disclosure.

FIG. 15 is a flowchart showing a process example of a method in a mobile base station according to another embodiment of the disclosure.

As shown in FIG. 15, the method starts from step S1501. In the step S1501, a movement location of the mobile base station is predicted according to location information and motion status of the mobile base station. Then, the method proceeds to step S1502. In the step S1502, a database in which location information is associated with cooperative base stations is searched according to the predicted movement location to select a cooperative base station regarding the movement location, thereby the selected cooperative base station and the mobile base station cooperatively serve a user equipment served by the mobile base station. The database herein may be created for example by the method described above with reference to FIG. 14, and may be stored in a memory of the mobile base station, a server and/or a neighboring mobile base station. For a database not stored at the local, the mobile base station may perform searching by downloading the database from a server and/or a neighboring mobile base station.

Preferably, the mobile base station may instruct, if the predicted movement location is not in the database and/or data regarding the movement location in the database has been invalid, the user equipment to measure downlink channel quality of a detectable base station regarding the movement location so as to determine the cooperative base station regarding the movement location according to a measurement result of the user equipment, and record the determined cooperative base station in association with location information in the database.

Similarly, it should be understood that, the method embodiment described herein corresponds to the embodiment of the electronic device in the mobile base station described above with reference to FIG. 9 through FIG. 12; thus for contents not described in detail herein, reference may be made to the above corresponding descriptions, and repeated descriptions will not be made herein.

Figure 16:
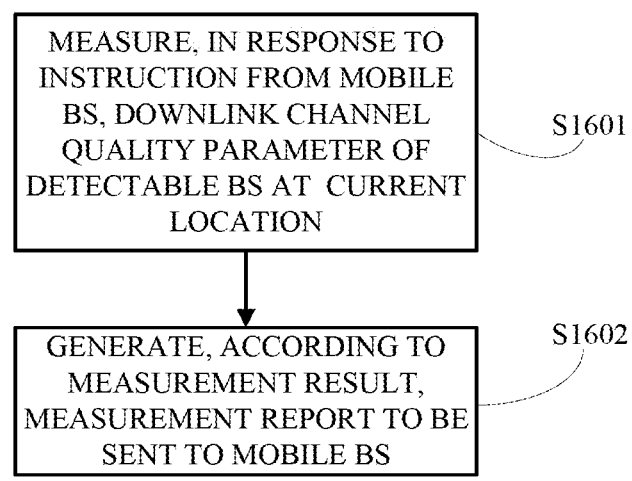
FIG. 16 is a flowchart showing a process example of a method in a user equipment according to an embodiment of the disclosure.

FIG. 16 is a flowchart showing a process example of a method in a user equipment according to an embodiment of the disclosure.

As shown in FIG. 16, the method starts from step S1601. In the step S1601, the user equipment measures, in response to an instruction from a mobile base station providing a service, a downlink channel quality parameter of a detectable base station at a current location. Then, the method proceeds to step S1602. In the step S1602, the user equipment generates, based on the measured downlink channel quality parameter, a measurement report to be sent to the mobile base station, so that the mobile base station can determine a cooperative base station according to the measurement report so as to provide a cooperative service to the user equipment.

It should be understood that, the method embodiment described herein corresponds to the embodiment of the electronic device in the user equipment described above with reference to FIG. 13; thus for contents not described in detail herein, reference may be made to the above corresponding descriptions, and repeated descriptions will not be made herein.

In addition, it should also be noted that the flowcharts as shown in FIG. 14 through FIG. 16 are only exemplary but not limitative, and those skilled in the art can carry out various modifications, such as adjustment of an execution order of the above method flow, addition of additional steps or the like, according to the principle of the disclosure.

According to the above embodiments of the disclosure, at least one of the following effects can be implemented:

1. by creating a coordination reference table in which location information is associated with cooperative base stations according to a movement track of a mobile base station, the mobile base station can select a corresponding cooperative base station according to its location information and movement status, for example, such a coordination manner as blank subframes or beamforming, and then a stationary base station will select to no longer transmit power on an interference resource block, or adjust an antenna transmission angle to keep off a direction of a user, thus making it possible to reduce inter-cell interference suffered by a user equipment through coordination between base stations; and it is also made possible to perform jointed transmission of information utilizing cooperative base stations, thus improving the quality of service for a user equipment;

2. through a multiplex strategy such as storing a coordination reference table in a local memory, uploading the coordination reference table to a server and sharing the coordination reference table with a surrounding mobile base station, continuous and repeated selections of cooperative base stations each time are avoided, and system overhead for selection of a cooperative base station, including time, signaling overhead and the like, is reduced, thus improving system efficiency;

3. periodic and non-periodical table item update mechanisms can cope with sudden variation of network environment, thus improving system reliability;

4. the disclosure does not limit the kind of the parameter for measurement of channel quality, and thus is applicable to any parameter helpful for differentiating channel quality.

5. the disclosure does not limit the technical means of inter-cell coordination, and thus is applicable to different coordination schemes such as jointed transmission, cooperative scheduling, inter-cell interference coordination and the like; and 6. the disclosure can flexibly adjust a measurement cycle of user equipment of a mobile base station, and thus can be adapted to network environment with different density.

It should be understood that, machine executable instructions in a storage medium and a program product according to an embodiment of the disclosure may be further configured to implement methods corresponding to the above device embodiments; thus for contents not described in detail herein, reference may be made to the previous corresponding descriptions, and repeated descriptions will not be made herein.

Correspondingly, a storage medium for carrying the above program product comprising machine executable instructions and the above coordination reference table is also included in the disclosure of the present invention. The storage medium includes but is not limited to a floppy disc, an optical disc, a magnetic optical disc, a memory card, a memory stick and the like.

Figure 17:
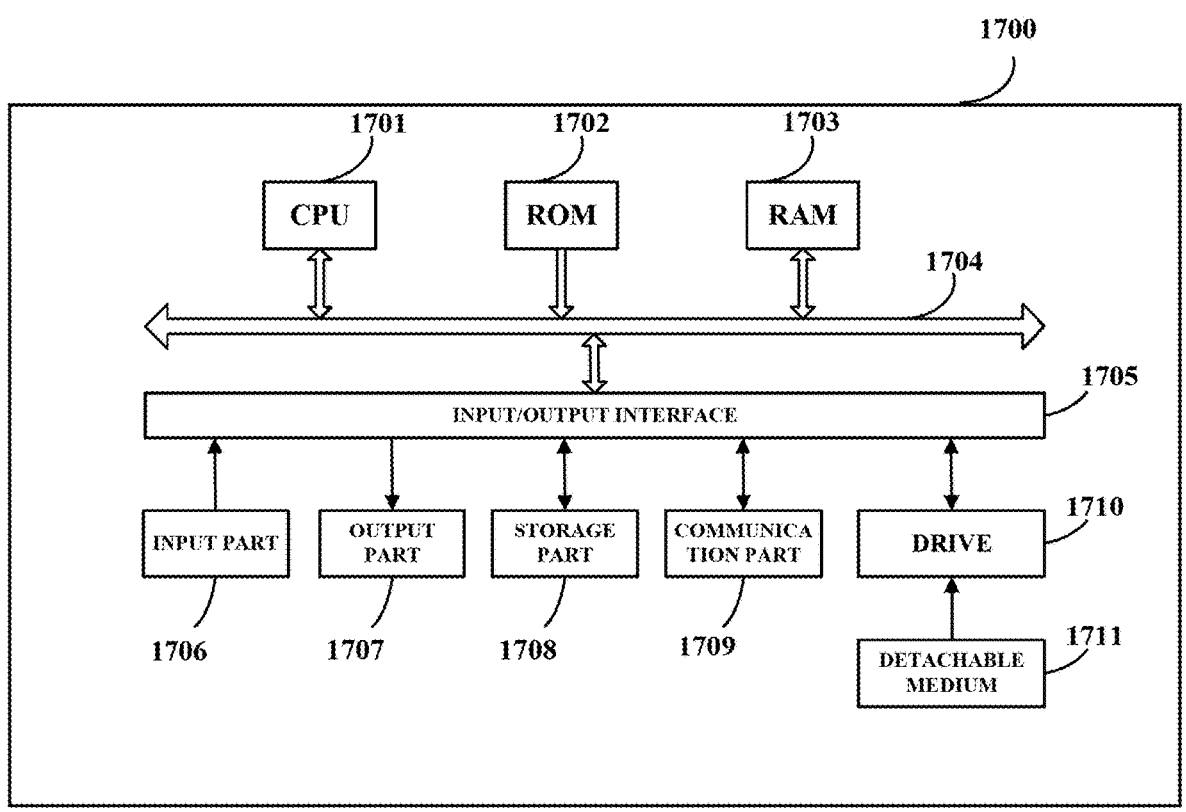
FIG. 17 is a block diagram showing an exemplary structure of a personal computer as an information processing device usable in an embodiment of the disclosure.

In addition, it should also be noted that, the foregoing series of processing and devices may also be implemented by software and/or firmware. In the case of implementation by software and/or firmware, a program constituting the software is installed from a storage medium or a network to a computer having a purpose-specific hardware structure, for example the universal personal computer 1700 as shown in FIG. 17. The computer, when installed with various programs, can execute various functions and the like. FIG. 17 is a block diagram showing an exemplary structure of a personal computer as an information processing device usable in an embodiment of the disclosure.

In FIG. 17, a Central Processing Unit (CPU) 1701 executes various processing according to a program stored in a Read-Only Memory (ROM) 1702 or a program uploaded from a storage part 1708 to a Random Access Memory (RAM) 1703. In the RAM 1703, data needed when the CPU 1701 executes various processing and the like is also stored according to requirements.

The CPU 1701, the ROM 1702 and the RAM 1703 are connected to each other via a bus 1704. An input/output interface 1705 is also connected to the bus 1704.

The following components are connected to the input/output interface 1705: an input part 1706, including a keyboard, a mouse and the like; an output part 1707, including a display, such as a Cathode Ray Tube (CRT), a Liquid Crystal Display (LCD) and the like, as well as a speaker and the like; the storage part 1708, including a hard disc and the like; and a communication part 1709, including a network interface card such as an LAN card, a modem and the like. The communication part 1709 executes communication processing via a network such as the Internet.

According to requirements, a driver 1710 is also connected to the input/output interface 1705. A detachable medium 1711 such as a magnetic disc, an optical disc, a magnetic optical disc, a semiconductor memory and the like is installed on the driver 1710 according to requirements, such that a computer program read therefrom is installed in the storage part 1708 according to requirements.

In a case where the above series of processing is implemented by software, a program constituting the software is installed from a network such as the Internet or a storage medium such as the detachable medium 1711.

Those skilled in the art should appreciate that such a storage medium is not limited to the detachable medium 1111 having stored therein a program and distributed separately from an apparatus to provide the program to a user as shown in FIG. 11. Examples of the detachable medium 1111 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the storage medium may be hard discs and the like included in the ROM 1102 and the storage part 1108, in which programs are stored, and which are distributed concurrently with the apparatus including them to users.

The technology of the disclosure can be applied to various products, including a base station and a user equipment. Specifically, the base station may be realized as any type of evolutional node B (eNB), such as macro eNB and small eNB. The small eNB may be an eNB of a cell with smaller coverage than a macro cell, such as a pico eNB, a micro eNB and a home (femto) eNB. Alternatively, the base station may be realized as any other type of base station, such as NodeB and Base Transceiver Station (BTS). The base station may comprise: a main body (also called base station equipment) configured to control wireless communication; and one or more Remote Radio Heads (RRHs) arranged at different places of the main body. In addition, all the various types of terminals which will be described below can operate as base stations by temporarily or semi-persistently executing base station functions.

The user equipment may be realized as a mobile terminal (such as an intelligent telephone, a tablet Personal Computer (PC), a notebook PC, a portable game terminal, a portable/softdog mobile router and a digital image pick-up device) or an in-vehicle terminal (such as an automobile navigation device). The user equipment may also be realized as a terminal for executing Machine-to-Machine (M2M) communication (also called a Machine Type Communication (MTC) terminal). In addition, the user equipment may be a wireless communication module (such as an integrated circuit module including a single wafer) installed on each of the above terminals.

Hereinafter, application examples according to the disclosure will be described with reference to FIG. 18 through FIG. 21.

Application Examples Regarding Base Station

First Application Example

Figure 18:
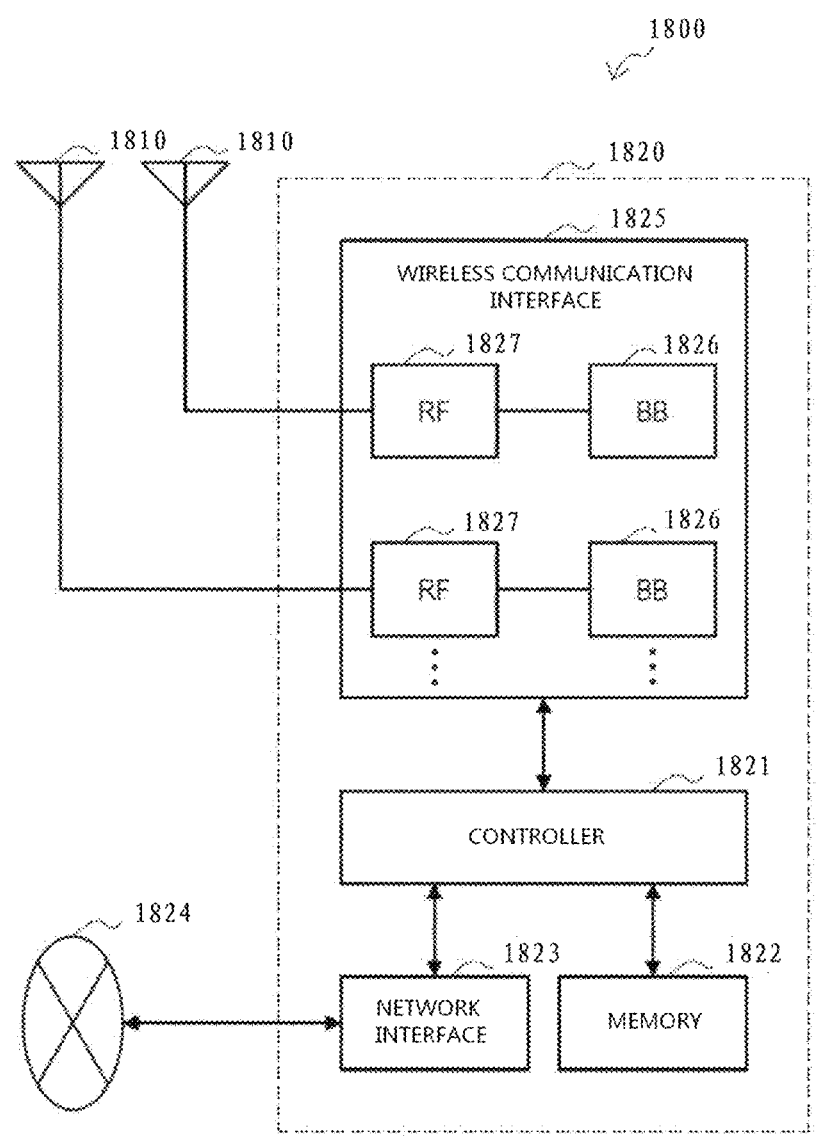
FIG. 18 is a block diagram showing a first example of schematic configuration of an evolutional node (eNB) to which the technology according to the disclosure can be applied.

FIG. 18 is a block diagram showing a first example of schematic configuration of an eNB to which the technology according to the disclosure can be applied. The eNB 1800 comprises one or more antennas 1810 and base station equipment 1820. The base station equipment 1820 and each antenna 1810 may be connected to each other via an RF cable.

Each of the antennas 1810 comprises a single or more antenna elements (such as a plurality of antenna elements included in a Multi-Input Multi-Output (MIMO) antenna), and is used for the base station equipment 1820 to transmit and receive a wireless signal. As shown in FIG. 18, the eNB 1800 may comprise a plurality of antennas 1810. For example, the plurality of antennas 1810 may be compatible with a plurality of frequency bands used by the eNB 1800. Although FIG. 18 shows an example in which the eNB 1800 comprises a plurality of antennas 1810, the eNB 1800 may also comprise a single antenna 1810.

The base station equipment 1820 may comprise a controller 1821, a memory 1822, a network interface 1823, and a wireless communication interface 1825.

The controller 1821 may be for example a CPU or a DSP, and manipulate various functions of a higher layer of the base station equipment 1820. For example, the controller 1821 venerates data packets according to data in a signal processed by the wireless communication interface 1825, and transfers the generated packets via the network interface 1823. The controller 1821 may perform binding for data from a plurality of baseband processors to generate bound packets, and transfer the generated bound packets. The controller 1821 may have a logic function of executing control, which is such as radio resource control, radio bearer control, mobility management, admission rule and dispatching. The control may be executed in combination with a nearby eNB or a core network node. The memory 1822 comprises an RAM and an ROM, and stores programs executed by the controller 1821 and various types of control data (such as a terminal list, transmission power data, and dispatching data).

The network interface 1823 is a communication interface for connecting the base station equipment 1820 to a core network 1824. The controller 1821 may communicate with a core network node or another eNB via the network interface 1823. In this case, the eNB 1800 and the core network node or another eNB may be connected to each other via a logic interface (such as S1 interface and X2 interface). The network interface 1823 may also be a wired communication interface, or a wireless communication interface for a wireless backhaul. If the network interface 1823 is a wired communication interface, as compared with frequency bands used by the wireless communication interface 1825, the network interface 1823 may use higher frequency bands for wireless communication.

The wireless communication interface 1825 supports any cellular communication scheme (such as Long Term Evolution (LTE) and LTE-Advanced), and is provided with a wireless connection to a terminal located in a cell of the eNB 1800 via the antenna 1810. The wireless communication interface 1825 generally may comprise for example a Base-Band (BB) processor 1826 and an RF circuit 1827. The BB processor 1826 may execute for example coding/decoding, modulation/demodulation and multiplexing/demultiplexing, and execute various types of signal processing of layers (for example L1, Medium Access control (MAC), Radio Link Control (RLC) and Packet Data Convergence Protocol (PDCP)). Instead of the controller 1821, the BB processor 1826 may have part of all of the above logic function. The BB processor 1826 may be a memory which stores a communication control program, or a module comprising a processor configured to execute a program and a related circuit. The function of the BB processor 1826 may be changed through program updating. The module may be a card or blade inserted in a slot of the base station equipment 1820. Alternatively, the module may also be a chip installed on a card or blade. Meanwhile, the RF circuit 1827 may comprise for example a frequency mixer, a filter and an amplifier, and transmit and receive a wireless signal via the antenna 1810.

As shown in FIG. 18, the wireless communication interface 1825 may comprise a plurality of BB processors 1826. For example, the plurality of BB processors 1826 may be compatible with a plurality of frequency bands used by the eNB 1800. As shown in FIG. 18, the wireless communication interface 1825 may comprise a plurality of RF circuits 1827. For example, the plurality of RF circuits 1827 may be compatible with a plurality of antenna elements. Although FIG. 18 shows an example in which the wireless communication interface 1825 comprises a plurality of BB processors 1826 and a plurality of RF circuits 1827, the wireless communication interface 1825 may also comprise a single BB processor 1826 or a single RF circuit 1827.

Second Application Example

Figure 19:
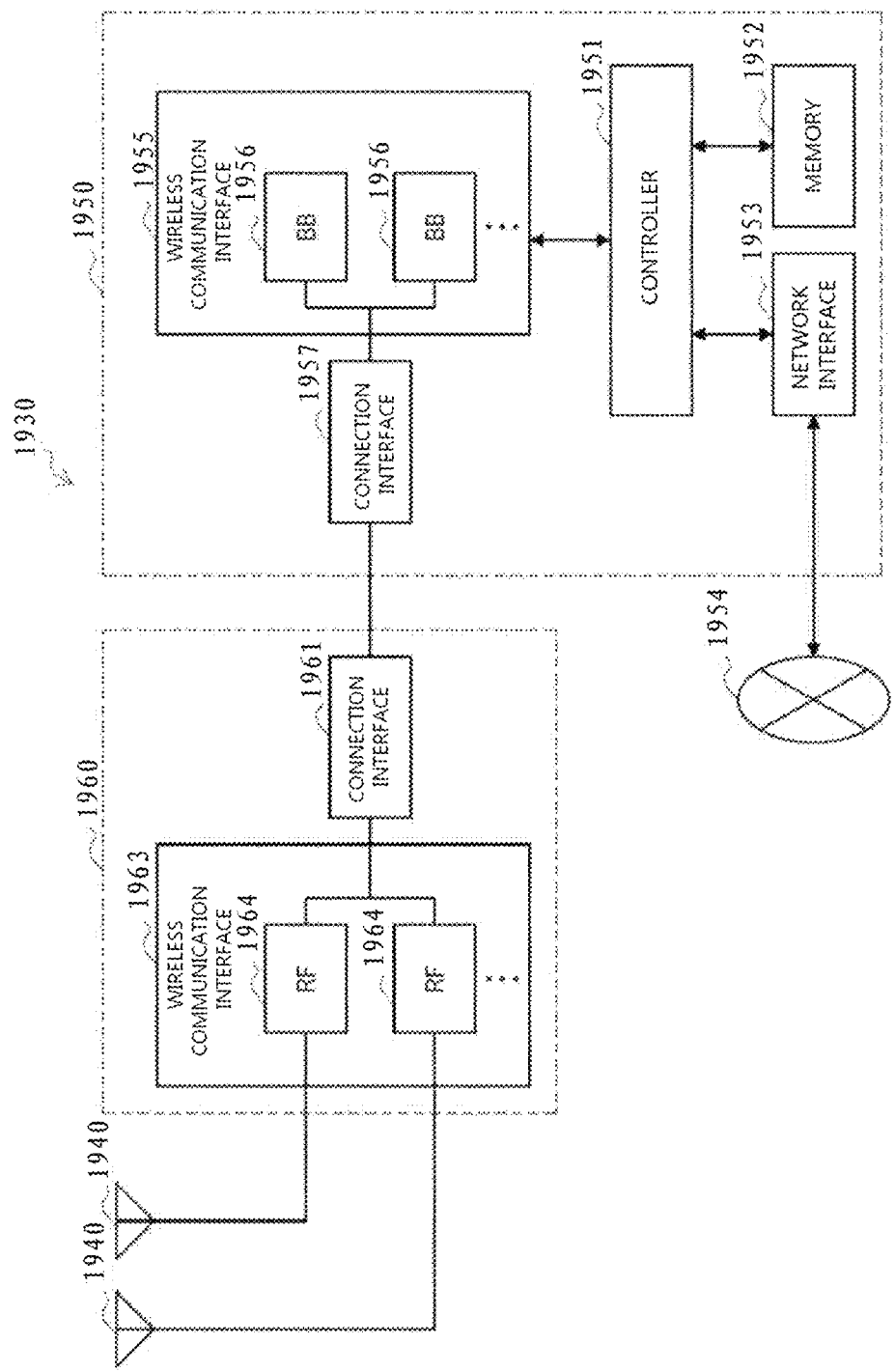
FIG. 19 is a block diagram showing a second example of schematic configuration of an eNB to which the technology according to the disclosure can be applied.

FIG. 19 is a block diagram showing a second example of schematic configuration of an eNB to which the technology according to the disclosure can be applied. The eNB 1930 comprises a plurality of antennas 1940, base station equipment 1950, and an RRH 1960. The RRH 1960 and each antenna 1940 may be connected to each other via an RF cable. The base station equipment 1950 and the RRH 1960 may be connected to each other via a high-speed line such as an optical fiber cable.

Each of the antennas 1940 comprises a single or more antenna elements (such as a plurality of antenna elements included in an MIMO antenna) and is used for the RRH 1960 to transmit and receive a wireless signal. As shown in FIG. 19, the eNB 1930 may comprise a plurality of antennas 1940. For example, the plurality of antennas 1940 may be compatible with a plurality of frequency bands used by the eNB 1930. Although FIG. 19 shows an example in which the eNB 1930 comprises a plurality of antennas 1940, the eNB 1930 may also comprise a single antenna 1940.

The base station equipment 1950 comprises a controller 1951, a memory 1952, a network interface 1953, a wireless communication interface 1955, and a connection interface 1957. The controller 1951, the memory 1952 and the network interface 1953 are the same as the controller 1821, the memory 1822 and the network interface 1823 described with reference to FIG. 18.

The wireless communication interface 1955 supports any cellular communication scheme (such as LTE and LTE-Advanced), and is provided with a wireless connection to a terminal located in a sector corresponding to the RRH 1960 via the RRH 1960 and the antenna 1940. The wireless communication interface 1955 generally may comprise for example a BB processor 1956. The BB processor 1956 is the same as the BB processor 1826 described with reference to FIG. 18, except for that the BB processor 1956 is connected to the RF circuit 1964 of the RRH 1960 via the connection interface 1957. As shown in FIG. 19, the wireless communication interface 1955 may comprise a plurality of BB processors 1956. For example, the plurality of BB processors 1956 may be compatible with a plurality of frequency bands used by the eNB 1930. Although FIG. 19 shows an example in which the wireless communication interface 1955 comprises a plurality of BB processors 1956, the wireless communication interface 1955 may also comprise a single BB processor 1956.

The connection interface 1957 is an interface for connecting the base station equipment 1950 (the wireless communication interface 1955) to the RRH 1960. The connection interface 1957 may also be a communication module for communication in the above high-speed line for connecting the base station equipment 1950 (the wireless communication interface 1955) to the RRH 1960.

The RRH 1960 comprises a connection interface 1961 and a wireless communication interface 1963.

The connection interface 1961 is an interface for connecting the RRH 1960 (the wireless communication interface 1963) to the base station equipment 1950. The connection interface 1961 may also be a communication module for communication in the above high-speed line.

The wireless communication interface 1963 transmits and receives a wireless signal via the antenna 1940. The wireless communication interface 1963 generally may comprise for example an RF circuit 1964. The RF circuit 1964 may comprise for example a frequency mixer, a filter and an amplifier, and transmit and receive a wireless signal via the antenna 1940. As shown in FIG. 19, the wireless communication interface 1963 may comprise a plurality of RF circuits 1964. For example, the plurality of RF circuits 1964 may support a plurality of antenna elements. Although FIG. 19 shows an example in which the wireless communication interface 1963 comprises a plurality of RF circuits 1964, the wireless communication interface 1963 may also comprise a single RF circuit 1964.

In the eNB 1800 and the eNB 1930 as shown in FIG. 18 and FIG. 19, the communication units in the electronic devices 300 and 800 may be realized by the wireless communication interface 1825 and the wireless communication interface 1955 and/or the wireless communication interface 1963. At least part of the functions of the instructing unit, the cooperative base station determining unit, the recording unit and the updating unit may also be implemented by the controller 1821 and the controller 1951.

Application Examples Regarding User Equipment

First Application Example

Figure 20:
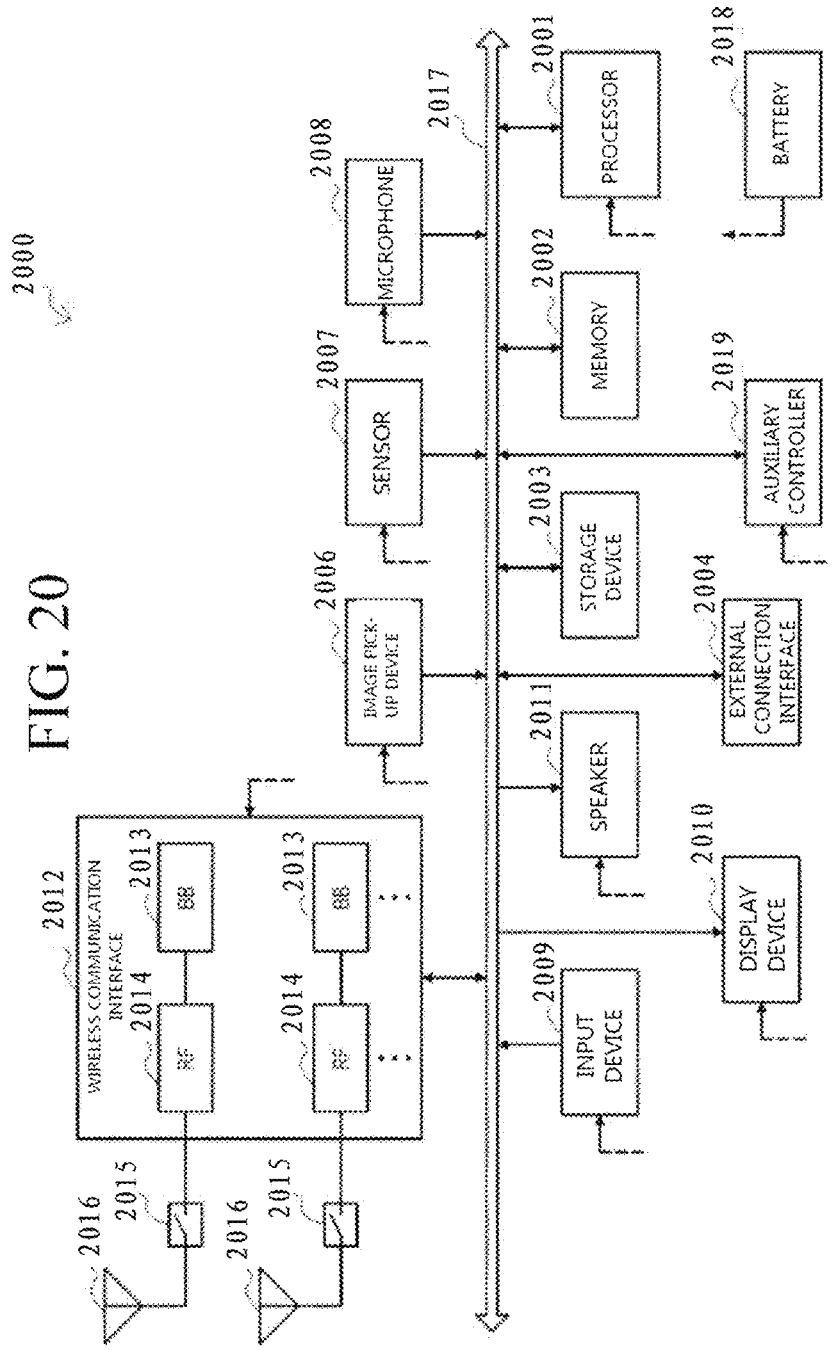
FIG. 20 is a block diagram showing an example of schematic configuration of an intelligent telephone to which the technology according to the disclosure can be applied.

FIG. 20 is a block diagram showing an example of schematic configuration of an intelligent telephone 2000 to which the technology according to the disclosure can be applied. The intelligent telephone 2000 comprises a processor 2001, a memory 2002, a storage device 2003, an external connection interface 2004, a image-pick up device 2006, a sensor 2007, a microphone 2008, an input device 2009, a display device 2010, a speaker 2011, a wireless communication interface 2012, one or more antenna switches 2015, one or more antennas 2016, a bus 2017, a battery 2018, and an auxiliary controller 2019.

The processor 2001 may be for example a CPU or a System on Chip (SoC), and control functions of an application layer and additional layers of the intelligent telephone 2000. The memory 2002 comprises an RAM and an ROM, and stores data and programs executed by the processor 2001. The storage device 2003 may comprise a storage medium, such as a semiconductor memory and a hard disc. The external connection interface 2004 is used for connecting an external device (such as a memory card and a Universal Serial Bus (USB) device) to an interface of the intelligent telephone 2000.

The image pick-up device 2006 comprises an image sensor (such as a Charge Coupled Device (CCD) and a Complementary Metal Oxide Semiconductor (CMOS)), and generates a captured image. The sensor 2007 may comprise a group of sensors, such as a measurement sensor, a gyro sensor, a geomagnetic sensor and an acceleration sensor. The microphone 2008 converts sound inputted to the intelligent telephone 2000 to an audio signal. The input device 2009 comprises for example a touch sensor configured to detect a touch on a screen of the display device 2010, a keypad, a keyboard, buttons or switches, and receives an operation or information inputted from a user. The display device 2010 comprises a screen (such as a Liquid Crystal Display (LCD) and an Organic Light-Emitting Diode (OLED) display), and displays an output image of the intelligent telephone 2000. The speaker 2011 converts the audio signal outputted from the intelligent telephone 2000 to sound.

The wireless communication interface 2012 supports any cellular communication scheme (such as LTE and LTE-Advanced), and executes wireless communication. The wireless communication interface 2012 generally may comprise for example a BB processor 2013 and an RF circuit 2014. The BB processor 2013 may execute for example coding/decoding, modulation/demodulation and multiplexing/demultiplexing, and execute various types of signal processing for wireless communication. Meanwhile, the RF circuit 2014 may comprise for example a frequency mixer, a filter and an amplifier, and transmit and receive a wireless signal via the antenna 2016. The wireless communication interface 2012 may be a chip module on which a BB processor 2013 and an RF circuit 2014 are integrated. As shown in FIG. 20, the wireless communication interface 2012 may comprise a plurality of BB processors 2013 and a plurality of RF circuits 2014. Although FIG. 20 shows an example in which the wireless communication interface 2012 comprises a plurality of BB processors 2013 and a plurality of RF circuits 2014, the wireless communication interface 2012 may also comprise a single BB processor 2013 or a single RF circuit 2014.

In addition, besides the cellular communication schemes, the wireless communication interface 2012 may support other types of wireless communication schemes, such as a short range wireless communication scheme, a near field communication scheme and a wireless Local Area. Network (LAN) scheme. In this case, the wireless communication interface 2012 may comprise a BB processor 2013 and an RF circuit 2014 for each wireless communication scheme.

Each of the antenna switches 2015 switches a connection destination of the antenna 2016 between a plurality of circuits included in the wireless communication interface 2012 (for example, circuits for different wireless communication schemes).

Each of the antennas 2016 comprises a single or more antenna elements (such as a plurality of antenna elements included in an MIMO antenna), and is used for the communication interface 2012 to transmit and receive a wireless signal. As shown in FIG. 20, the intelligent telephone 2000 may comprise a plurality of antennas 2016. Although FIG. 20 shows an example in which the intelligent telephone 2000 comprises a plurality of antennas 2016, the intelligent telephone 2000 may also comprise a single antenna 2016.

In addition, the intelligent telephone 2000 may comprise an antenna 2016 for each wireless communication scheme. In this case, the antenna switch 2015 may be omitted from the configuration of the intelligent telephone 2000.

The bus 2017 connects the processor 2001, the memory 2002, the storage device 2003, the external connection interface 2004, the image pick-up device 2006, the sensor 2007, the microphone 2008, the input device 2009, the display device 2010, the speaker 2011, the wireless communication interface 2012 and the auxiliary controller 2019 to each other. The battery 2018 supplies electric power to the respective blocks of the intelligent telephone 2000 as shown in FIG. 20 via feeder lines which are partially shown as dashed lines in the figure. The auxiliary controller 2019 for example manipulates the least necessary function of the intelligent telephone 2000 in a sleep mode.

In the intelligent telephone 2000 as shown in FIG. 20, the communication unit in the electronic device 900 may be realized by the wireless communication interface 2012. At least part of the functions of the predicting unit and the selecting unit may also be implemented by the processor 2001 or the auxiliary controller 2091.

Second Application Example

Figure 21:
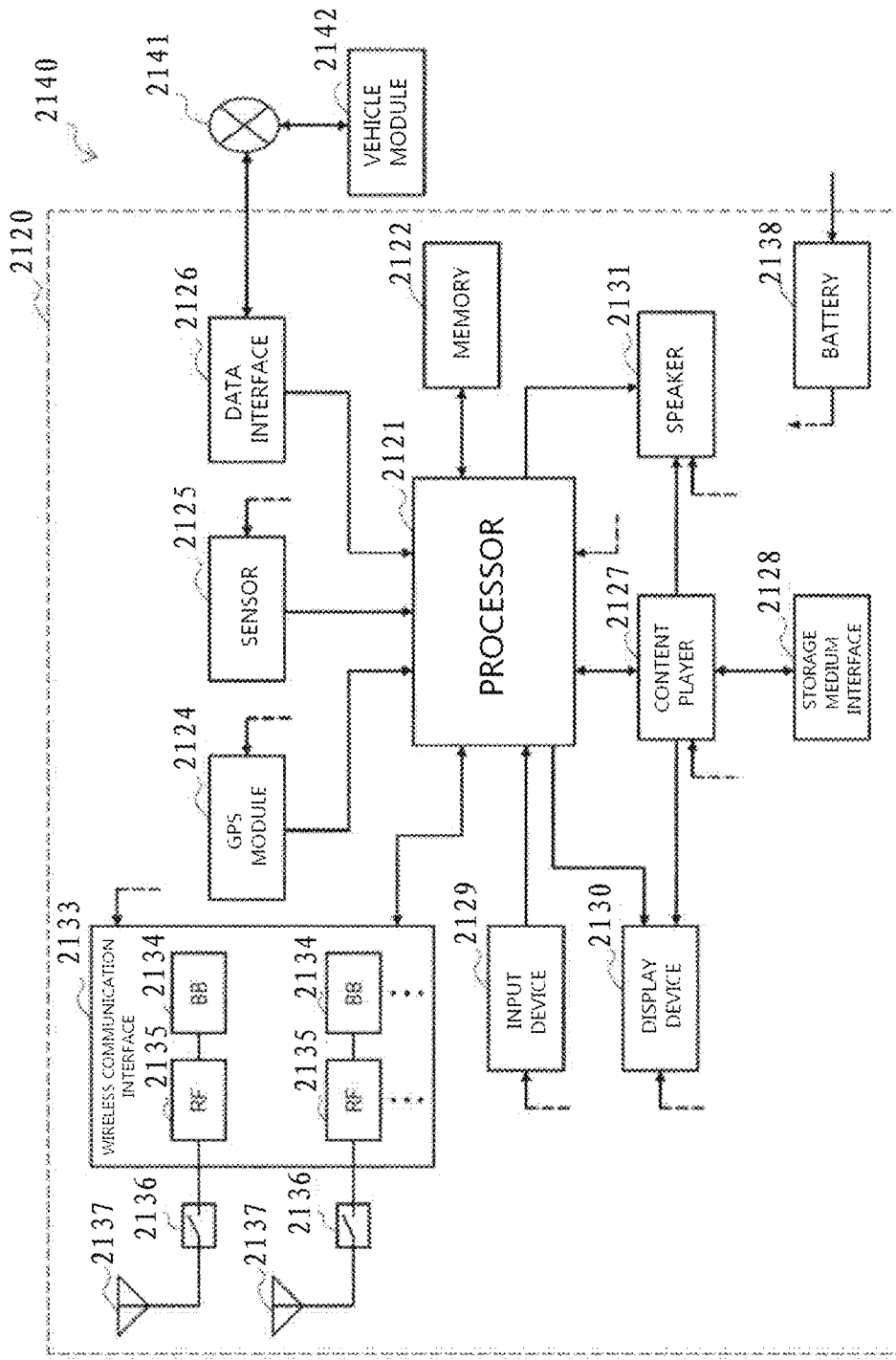
FIG. 21 is a block diagram showing an example of schematic configuration of an automobile navigation device to which the technology according to the disclosure can be applied.

FIG. 21 is a block diagram showing an example of schematic configuration of an automobile navigation device 2120 to which the technology according to the disclosure can be applied. The automobile navigation device 2120 comprises a processor 2121, a memory 2122, a Global Positioning system (GPS) module 2124, a sensor 2125, a data interference 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be for example a CPU or a SoC, and controls a navigation function and additional functions of the automobile navigation device 2120. The memory 2122 comprises an RAM and an ROM, and stores data and programs executed by the processor 2121.

The GPS module 2124 measures a position (such as a longitude, a latitude and a height) of the automobile navigation device 2120 by using a GPS signal received from a GPS satellite. The sensor 2125 may comprise a group of sensors, such as a gyro sensor, a geomagnetic sensor and an air pressure sensor. The data interface 2126 is connected to for example an in-vehicle network 2141 via a terminal which is not shown, and acquires data (such as vehicle speed data) generated by a vehicle.

The content player 2127 reproduces content stored in a storage medium (such as a CD and a DCD). The storage medium is inserted in the storage medium interface 2128. The input device 2129 comprises for example a touch sensor configured to detect a touch on a screen of the display device 2130, buttons or switches, and receives an operation or information inputted from a user. The display device 2130 comprises a screen such as an LCD or an OLED display, and displays an image of the navigation function or the reproduced content. The speaker 2131 outputs sound of the navigation function or the reproduced content.

The wireless communication interface 2133 supports any cellular communication scheme (such as LTE and LTE-Advanced), and executes wireless communication. The wireless communication interface 2133 generally may comprise for example a BB processor 2134 and an RF circuit 2135. The BB processor 2134 may execute for example coding/decoding, modulation/demodulation and multiplexing/demultiplexing, and execute various types of signal processing for wireless communication. Meanwhile, the RF circuit 2135 may comprise for example a frequency mixer, a filter and an amplifier, and transmit and receive a wireless signal via the antenna 2137. The wireless communication interface 2133 may also be a chip module on which a BB processor 2134 and an RF circuit 2135 are integrated. As shown in FIG. 21, the wireless communication interface 2133 may comprise a plurality of BB processors 2134 and a plurality of RF circuits 2135. Although FIG. 21 shows an example in which the wireless communication interface 2133 comprises a plurality of BB processors 2134 and a plurality of RF circuits 2135, the wireless communication interface 2133 may also comprise a single BB processor 2134 or a single RF circuit 2135.

In addition, besides the cellular communication schemes, the wireless communication interface 2133 may support other types of wireless communication schemes, such as a short range wireless communication scheme, a near field communication scheme and a wireless LAN scheme. In this case, for each wireless communication scheme, the wireless communication interface 2133 may comprise a BB processor 2134 and an RF circuit 2235.

Each of the antenna switches 2136 switches a connection destination of the antenna 2137 between a plurality of circuits included in the wireless communication interface 2133 (for example, circuits for different wireless communication schemes).

Each of the antennas 2137 comprises a single or more antenna elements (such as a plurality of antenna elements included in an MIMO antenna), and is used for the communication interface 2133 to transmit and receive a wireless signal. As shown in FIG. 21, the automobile navigation device 2120 may comprise a plurality of antennas 2137. Although FIG. 21 shows an example in which the automobile navigation device 2120 comprises a plurality of antennas 2137, the automobile navigation device 2120 may also comprise a single antenna 2137.

In addition, the automobile navigation device 2120 may comprise an antenna 2137 for each wireless communication scheme. In this case, the antenna switch 2136 may be omitted from the configuration of the automobile navigation device 2120.

The battery 2138 supplies electric power to the respective blocks of the automobile navigation device 2120 as shown in FIG. 21 via feeder lines which are partially shown as dashed lines in the figure. The battery 2138 accumulates the electric power supplied from the vehicle In the automobile navigation device 2120 as shown in FIG. 21, the communication unit in the electronic device 900 may be realized by the wireless communication interface 2133. At least part of the functions of the predicting unit and the selecting unit may also be implemented by the processor 2121.

The technology of the disclosure may also be realized as an in-vehicle system (or vehicle) 2140 comprising one or more of the following blocks: the automobile navigation device 2120, the in-vehicle network 2141 and a vehicle module 2142. The vehicle module 2142 generates vehicle data (such as vehicle speed, engine speed and fault information), and outputs the generated data to the in-vehicle network 2141.

Preferred embodiments of the discourse have been described above with reference to the drawings. However, the disclosure of course is not limited to the above examples. Those skilled in the art can obtain various alterations and modifications within the scope of the appended claims, and it should be understood that these alterations and modifications naturally will fall within the technical scope of the disclosure.

For example, in the above embodiments, a plurality of functions included in one unit may be implemented by separate devices. Alternatively, in the above embodiments, a plurality of functions implemented by a plurality of units may be implemented by separate devices, respectively. In addition, one of the above functions may be implemented by a plurality of units. Undoubtedly, such configuration is included within the technical scope of the disclosure.

In the specification, the steps described in the flowcharts not only include processing executed in the order according to a time sequence but also include processing executed in parallel or separately but not necessarily according to a time sequence. In addition, even if in steps in which processing is executed according to a time sequence, the order undoubtedly still can be appropriately changed.

Although the disclosure and the advantageous thereof have been described in detail, it should be understood that various alterations, substitutions or transformations may be made without departing from the spirit and the scope of the disclosure as defined by the appended claims. Moreover, terms "include" and "comprise" or any other variants thereof in the embodiments of the disclosure are intended to cover non-exclusive inclusion, such that a process, a method, an article or an apparatus including a series of elements not only includes those elements but also includes other elements not explicitly listed or but also includes elements intrinsic to such a process, method, article or apparatus. In the absence of more limitations, elements defined by expression "including one . . . " do not exclude further existence of other identical elements in a process, a method, an article or an apparatus including the elements.

The invention claimed is:

1. An electronic device in a mobile base station, the electronic device comprising a processor configured to:
    predict, according to location information and motion status of the mobile base station, a movement location of the mobile base station; and
    search, according to the predicted movement location, a database in which location information is associated with cooperative base stations to select a cooperative base station regarding the movement location, thereby the selected cooperative base station and the mobile base station cooperatively serve a user equipment served by the mobile base station, wherein
    the processor is further configured to instruct, if the movement location is not in the database and/or data regarding the movement location in the database has been invalid, the user equipment to measure downlink channel quality of a detectable base station regarding the movement location so as to determine the cooperative base station regarding the movement location according to a measurement result of the user equipment.

2. The electronic device according to claim 1, wherein the database is stored in a memory of the electronic device, a server and/or a neighboring mobile base station.

3. The electronic device according to claim 1, wherein the processor is further configured to record the determined cooperative base station in association with the movement location in the database.

4. The electronic device according to claim 1, wherein the cooperative base station is a stationary base station.

5. The electronic device according to claim 1, wherein the electronic device further operates as the mobile base station and the electronic device further comprises:
    a transceiver configured to perform data reception and transmission operations.

* * * * *